(12) United States Patent
Va et al.

(10) Patent No.: US 11,742,925 B2
(45) Date of Patent: Aug. 29, 2023

(54) METHODS AND APPARATUS FOR MITIGATING CODEBOOK INACCURACY WHEN USING HIERARCHICAL BEAM OPERATIONS

(71) Applicant: Samsung Electronics Co., Ltd., Suwon-si (KR)

(72) Inventors: Vutha Va, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 17/191,586

(22) Filed: Mar. 3, 2021

(65) Prior Publication Data
US 2022/0038163 A1 Feb. 3, 2022

Related U.S. Application Data

(60) Provisional application No. 63/059,023, filed on Jul. 30, 2020.

(51) Int. Cl.
*H04B 7/06* (2006.01)
*H04W 24/10* (2009.01)
(Continued)

(52) U.S. Cl.
CPC ......... *H04B 7/0695* (2013.01); *H04B 7/0456* (2013.01); *H04B 17/318* (2015.01); *H04W 24/10* (2013.01); *G06N 20/00* (2019.01)

(58) Field of Classification Search
CPC .. H04B 7/0695; H04B 7/0456; H04B 17/318; H04W 24/10; G06N 20/00; G06N 3/08; G06N 20/10
See application file for complete search history.

(56) References Cited

U.S. PATENT DOCUMENTS 11,394,449 B2 * 7/2022 Xiang .................... H04B 7/088
2017/0237477 A1 8/2017 Fujio et al.
(Continued)

FOREIGN PATENT DOCUMENTS

WO 2020076442 A1 4/2020

OTHER PUBLICATIONS

"3rd Generation Partnership Project; Technical Specification Group Radio Access Network; NR; Physical channels and modulation (Release 15)", 3GPP TS 38.211 V15.0.0, Dec. 2017, 73 pages.
(Continued)

*Primary Examiner* — Habte Mered

(57) ABSTRACT

Methods and apparatuses in a wireless communication system. A method of operating a BS includes: receiving a first measurement report indicating information about at least first and second wide beams in a set of wide beams for a beam selection, the first measurement report generated based on measurement of a first set of child narrow beams of the first wide beam; determining whether a condition is detected for requesting measurement of a second set of child narrow beams of a second wide beam in the set of wide beams; determining to request the UE to measure the second set of child narrow beams of the second wide beam and; selecting a child narrow beam for use from one of the first set of child narrow beams and the second set of child narrow beams; and selecting the child narrow beam for use from the first set of child narrow beams.

20 Claims, 18 Drawing Sheets

(51) Int. Cl.
*H04B 7/0456* (2017.01)
*H04B 17/318* (2015.01)
*G06N 20/00* (2019.01)

(56) References Cited

U.S. PATENT DOCUMENTS

| | | |
|---|---|---|
| 2019/0081688 A1 | 3/2019 | Deenoo et al. |
| 2020/0015106 A1 | 1/2020 | Lane et al. |
| 2020/0077285 A1* | 3/2020 | Yu .................... H04W 72/12 |
| 2020/0084648 A1* | 3/2020 | Ramachandra ....... H04W 24/10 |
| 2020/0220678 A1 | 7/2020 | Liu et al. |
| 2021/0036800 A1* | 2/2021 | Berliner ................ H04L 1/0003 |
| 2021/0067978 A1* | 3/2021 | Cheraghi ............. H04B 17/336 |
| 2021/0258061 A1* | 8/2021 | Harrebek ............... H04B 7/088 |
| 2021/0258066 A1* | 8/2021 | Yu .......................... H04W 24/10 |
| 2021/0391965 A1* | 12/2021 | Raghavan ........... H04L 5/0091 |
| 2022/0116801 A1* | 4/2022 | Dallal .................. H04B 7/0697 |
| 2022/0294513 A1* | 9/2022 | Landstrom ........... H04B 7/0617 |
| 2022/0320725 A1* | 10/2022 | Komulainen .......... H01Q 19/17 |
| 2022/0376768 A1* | 11/2022 | Harrebek .............. H04L 5/0053 |
| 2022/0377589 A1* | 11/2022 | Hashimoto ........... H04W 24/10 |

OTHER PUBLICATIONS

"3rd Generation Partnership Project; Technical Specification Group Radio Access Network; NR; NR and NG-RAN Overall Description, Stage 2 (Release 15)", 3GPP TS 38.300 V15.3.0, Sep. 2018, 92 pages.

"3rd Generation Partnership Project; Technical Specification Group Radio Access Network; NR; Radio Resource Control (RRC) protocol specification (Release 15)", 3GPP TS 38.331 V15.0.0, Dec. 2017, 188 pages.

"3rd Generation Partnership Project; Technical Specification Group Radio Access Network; NR; Physical layer procedures for control (Release 15)", 3GPP TS 38.213 V15.0.0, Dec. 2017, 56 pages.

International Search Report and Written Opinion of the International Searching Authority dated Nov. 5, 2021, in connection with International Application No. PCT/KR2021/009892, 7 pages.

* cited by examiner

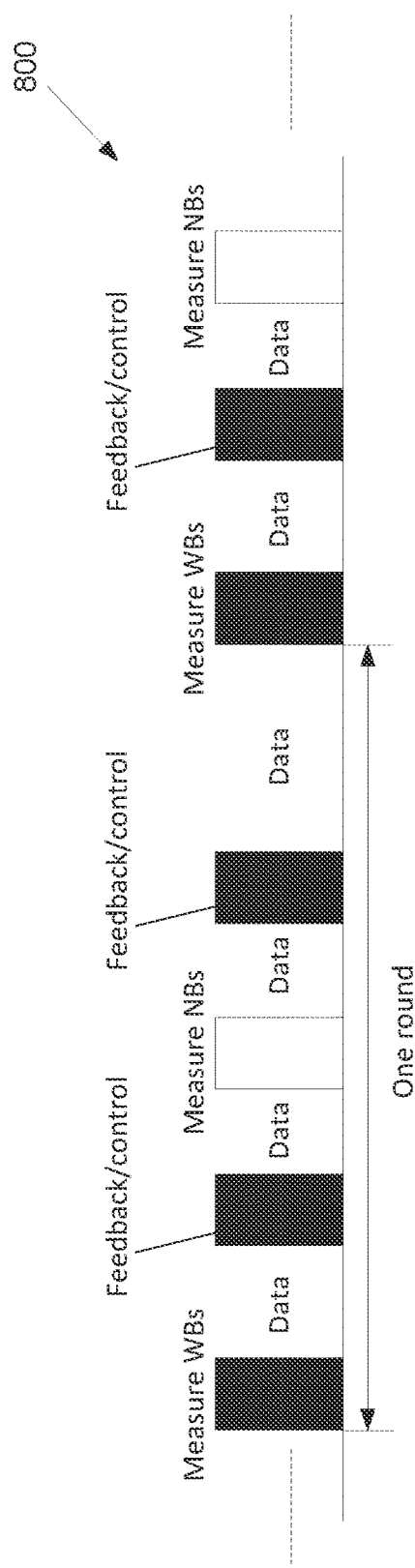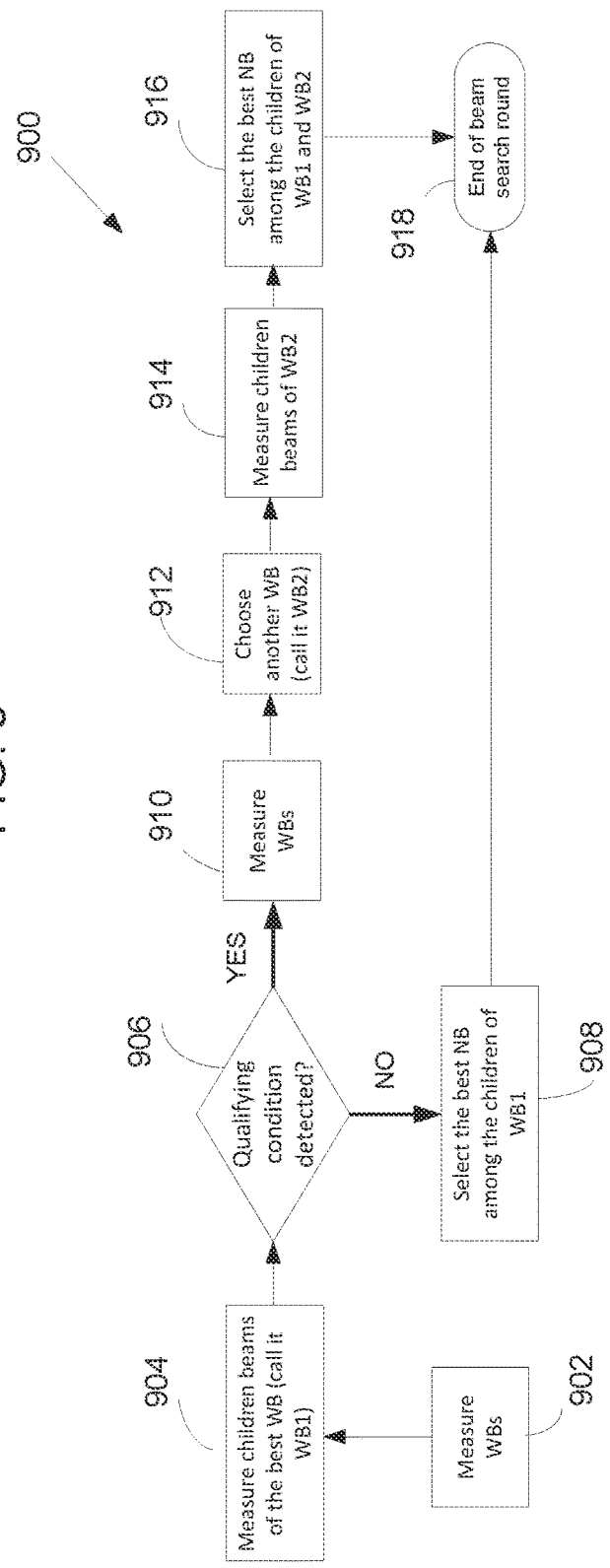
FIG. 8
FIG. 9

METHODS AND APPARATUS FOR MITIGATING CODEBOOK INACCURACY WHEN USING HIERARCHICAL BEAM OPERATIONS

CROSS-REFERENCE TO RELATED APPLICATIONS AND CLAIM OF PRIORITY

The present application claims priority to U.S. Provisional Patent Application No. 63/059,023 filed on Jul. 30, 2020. The content of the above-identified patent documents is incorporated herein by reference.

TECHNICAL FIELD

The present disclosure relates generally to a codebook design in a wireless communication system. In particular, methods and apparatus for mitigating codebook inaccuracy when using hierarchical beam operations are presented.

BACKGROUND

A communication system includes a downlink (DL) that conveys signals from transmission points such as base stations (BSs) or gNBs to user equipments (UEs) and an uplink (UL) that conveys signals from UEs to reception points such as the gNBs. A UE, also commonly referred to as a terminal or a mobile station, may be fixed or mobile and may be a cellular phone, a personal computer device, etc. An gNB, which is generally a fixed station, may also be referred to as an access point or other equivalent terminology.

SUMMARY

Embodiments of the present disclosure provide methods and apparatus for mitigating codebook inaccuracy when hierarchical beam operations are presented.

In one embodiment, a base station (BS) in a wireless communication system is provided. The BS comprises a transceiver configured to receive, from a user equipment (UE), a first measurement report indicating information about at least first and second wide beams in a set of wide beams for a beam selection, the first measurement report generated based on measurement of a first set of child narrow beams of the first wide beam. The BS further comprises a processor, operably connected to the transceiver, configured to: determine based on the first measurement report, whether a condition is detected for requesting measurement of a second set of child narrow beams of a second wide beam in the set of wide beams; based on a determination that the condition is detected, determine to request the UE to measure the second set of child narrow beams of the second wide beam and, after receipt of a second measurement report indicating information about the second set of child narrow beams, select a child narrow beam for use from one of the first set of child narrow beams and the second set of child narrow beams; and based on a determination that the condition is not detected, select the child narrow beam for use from the first set of child narrow beams.

In another embodiment, a user equipment (UE) in a wireless communication system is provided. The UE comprises a transceiver configured to: transmit, to a base station (BS), a first measurement report indicating information about at least first and second wide beams in a set of wide beams for a beam selection, the first measurement report generated based on measurement of a first set of child narrow beams of the first wide beam; and receive, from the BS, a request to measure a second set of child narrow beams of the second wide beam, after transmission of a second measurement report indicating information about the second set of child narrow beams, wherein: a reception of the request is determined based on a determination that a condition is detected, based on the first measurement report, for requesting measurement of a second set of child narrow beams of a second wide beam in the set of wide beams; a child narrow beam is selected, at the BS, for use from one of the first set of child narrow beams and the second set of child narrow beams; and the child narrow beam is selected, at the BS, for use from the first set of child narrow beams based on a determination that the condition is not detected.

In yet another embodiment, a method of a base station (BS) in a wireless communication system is provided. The method comprises: receiving, from a user equipment (UE), a first measurement report indicating information about at least first and second wide beams in a set of wide beams for a beam selection, the first measurement report generated based on measurement of a first set of child narrow beams of the first wide beam; determining based on the first measurement report, whether a condition is detected for requesting measurement of a second set of child narrow beams of a second wide beam in the set of wide beams; based on a determination that the condition is detected, determining to request the UE to measure the second set of child narrow beams of the second wide beam and, after receipt of a second measurement report indicating information about the second set of child narrow beams, select a child narrow beam for use from one of the first set of child narrow beams and the second set of child narrow beams; and based on a determination that the condition is not detected, selecting the child narrow beam for use from the first set of child narrow beams.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates an example timing structure according to embodiments of the present disclosure;

FIG. 9 illustrates a flowchart of a method for mitigating the impact of the codebook inaccuracy according to embodiments of the present disclosure;

DETAILED DESCRIPTION

FIG. 1 through FIG. 21, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 1:
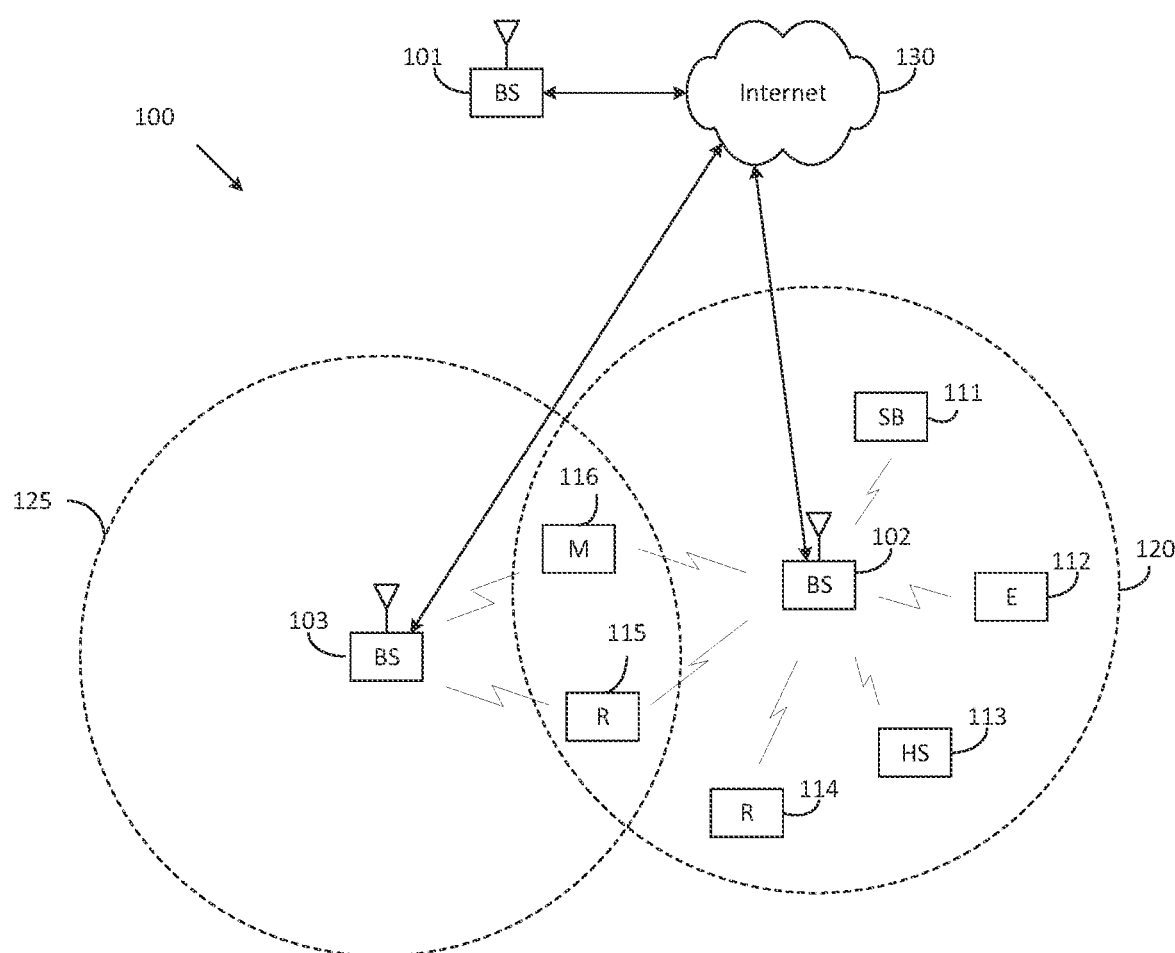
FIG. 1 illustrates an example wireless network according to embodiments of the present disclosure.
Figure 2:
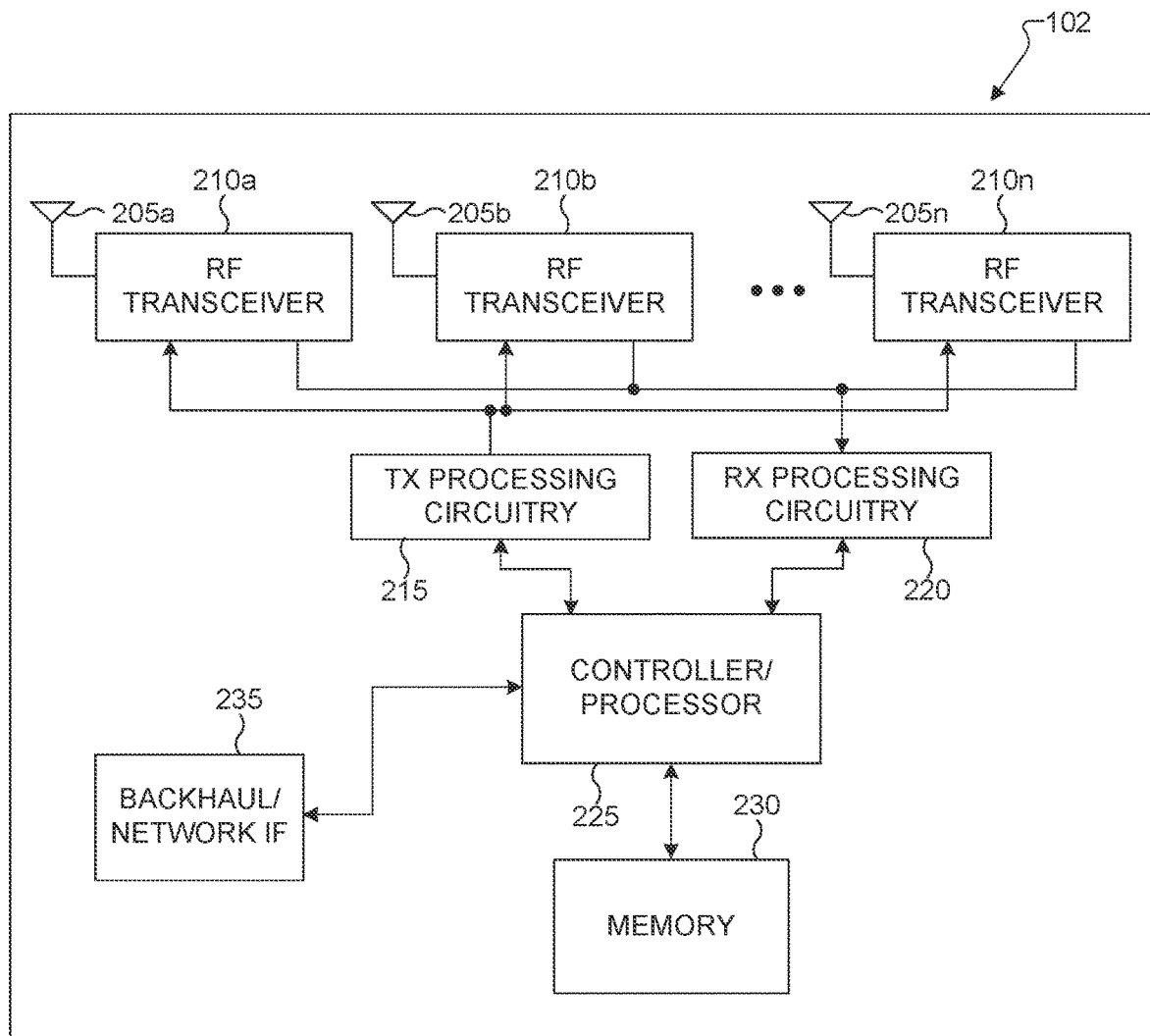
FIG. 2 illustrates an example gNB according to embodiments of the present disclosure.
Figure 3:
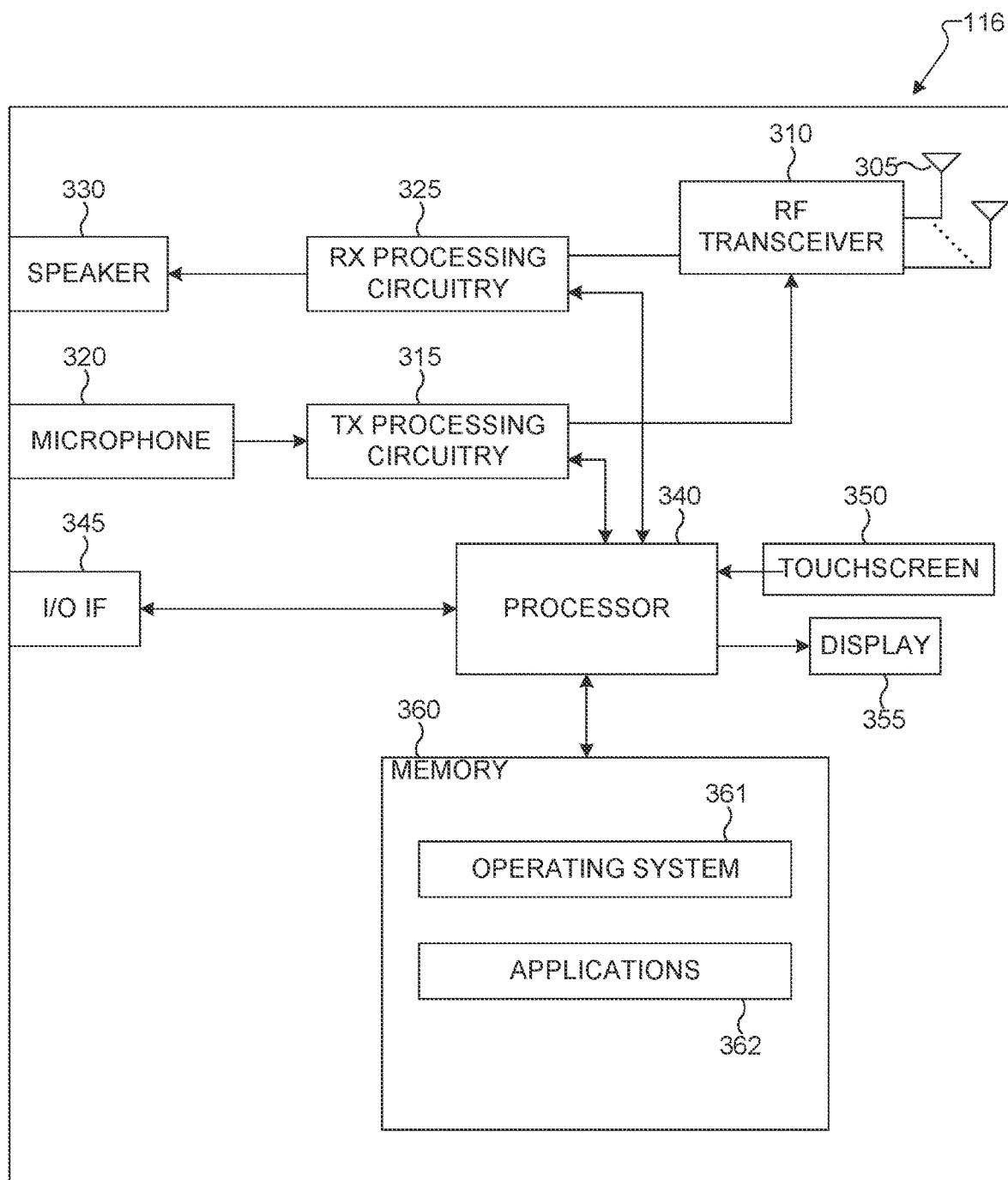
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for mitigating codebook inaccuracy when using hierarchical beam operations. In certain embodiments, and one or more of the gNBs 101-103 includes circuitry, programing, or a combination thereof for mitigating codebook inaccuracy when using hierarchical beam operations.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a RAM, and another part of the memory 360 could include a Flash memory or other read-only memory ROM.

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is provided to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a DL that refers to transmissions from a base station or one or more transmission points to UEs and an UL that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4A:
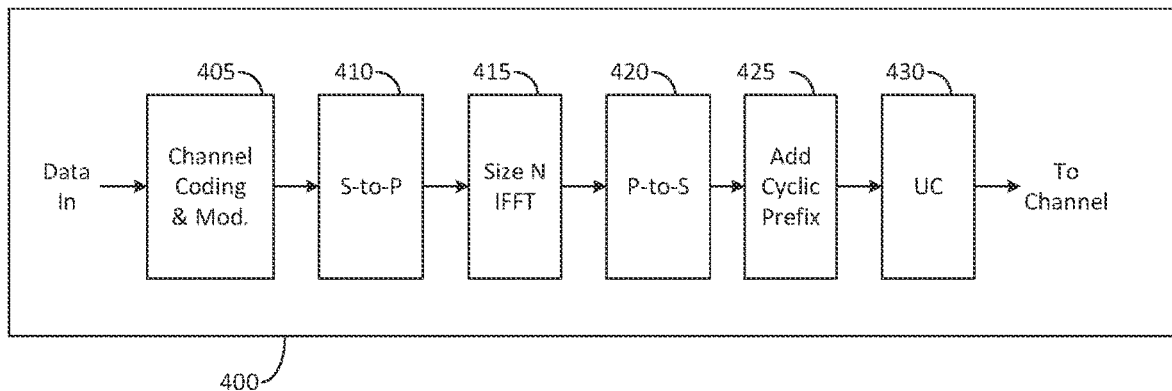
FIG. 4A illustrates a high-level diagram of an orthogonal frequency division multiple access transmit path according to embodiments of the present disclosure.
Figure 4B:
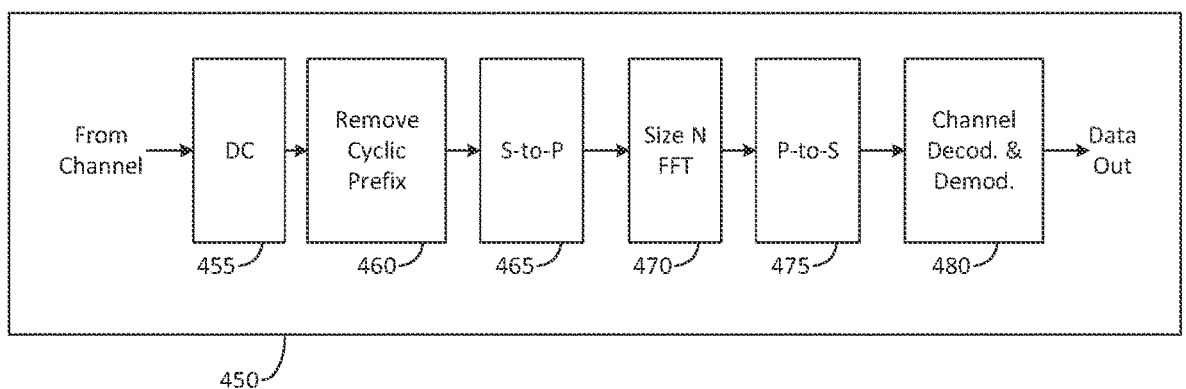
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an OFDMA communication. FIG. 4B is a high-level diagram of receive path circuitry. For example, the receive path circuitry may be used for an OFDMA communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the present disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A peer aware communication (PAC) network is a fully distributed communication network that allows direct communication among the PAC devices (PDs). A wireless personal area network (WPAN) or simply a personal area network (PAN) may be a fully distributed communication network. A WPAN or PAN is communication network that allows wireless connectivity among the PAN devices (PDs). PAN devices and PAC devices may be interchangeably used as PAC network is also a PAN network and vice versa.

PAC networks may employ several topologies like mesh, star, and/or peer-to-peer, etc. to support interactions among the PDs for various services. While the present disclosure uses PAC networks and PDs as an example to develop and illustrate the present disclosure, it is to be noted that the present disclosure is not confined to these networks. The general concepts developed in the present disclosure may be employed in various type of networks with different kind of scenarios.

Figure 5:
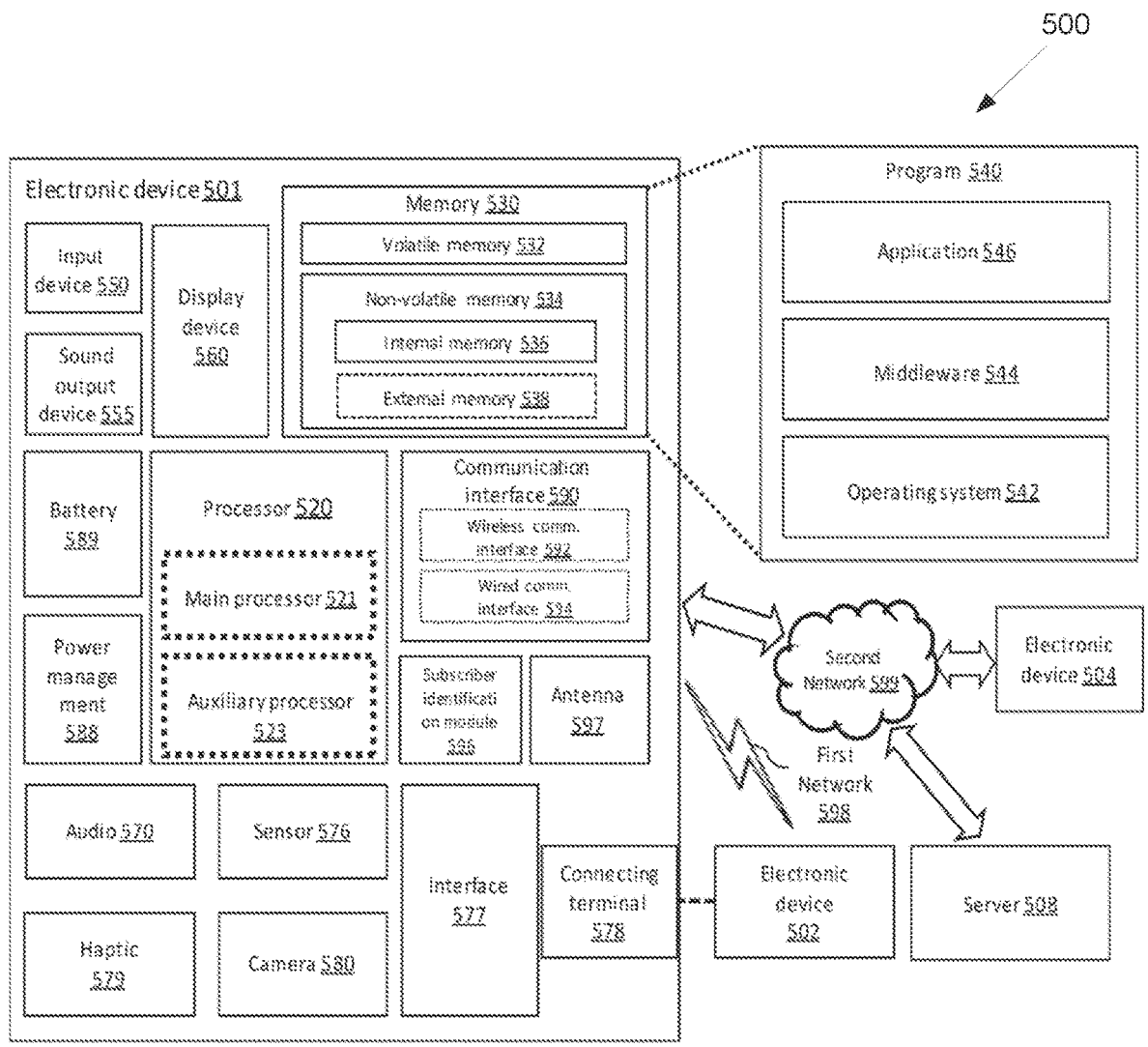
FIG. 5 illustrates an example electronic device according to embodiments of the present disclosure.

FIG. 5 illustrates an example electronic device 501 according to embodiments of the present disclosure. The embodiment of the electronic device 501 illustrated in FIG. 5 is for illustration only. FIG. 5 does not limit the scope of the present disclosure to any particular implementation. PDs can be an electronic device that may have communication and ranging capability. The electronics device may be referred to as a ranging device (RDEV), or an enhanced ranging device (ERDEV), or a secure ranging device (SRDEV) or any other similar name in accordance with the IEEE standard specification. RDEV, ERDEV, or SRDEV can be a part of an AP, a station (STA), an eNB, a gNB, a UE, or any other communication node with ranging capability.

Referring to FIG. 5, the electronic device 501 in the network environment 500 may communicate with an electronic device 502 via a first network 598 (e.g., a short-range wireless communication network), or an electronic device 104 or a server 508 via a second network 599 (e.g., a long-range wireless communication network). According to an embodiment, the electronic device 501 may communicate with the electronic device 504 via the server 508.

According to an embodiment, the electronic device 501 may include a processor 520, memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596, or an antenna 597. In some embodiments, at least one (e.g., the display device 560 or the camera 580) of the components may be omitted from the electronic device 501, or one or more other components may be added in the electronic device 501. In some embodiments, some of the components may be implemented as single integrated circuitry. For example, the sensor 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520 and may perform various data processing or computation. According to one embodiment of the present disclosure, as at least part of the data processing or computation, the processor 520 may load a command or data received from another component (e.g., the sensor 576 or the communication interface 590) in volatile memory 532, process the command or the data stored in the volatile memory 532, and store resulting data in non-volatile memory 534.

According to an embodiment of the present disclosure, the processor 520 may include a main processor 521 (e.g., a CPU or an AP), and an auxiliary processor 523 (e.g., a GPU, an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor 576, or the communication interface 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera 580 or the communication interface 190) functionally related to the auxiliary processor 523.

The memory 530 may store various data used by at least one component (e.g., the processor 520 or the sensor 576) of the electronic device 501. The various data may include, for example, software (e.g., the program 540) and input data or output data for a command related thereto. The memory 530 may include the volatile memory 532 or the non-volatile memory 534.

The program 50 may be stored in the memory 530 as software, and may include, for example, an OS 542, middleware 544, or an application 546.

The input device 550 may receive a command or data to be used by other components (e.g., the processor 520) of the electronic device 101, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the displays, hologram device, and projector. According to an embodiment, the display device 560 may include touch circuitry adapted to detect a touch, or sensor circuitry (e.g., a pressure sensor) adapted to measure the intensity of force incurred by the touch.

The audio 570 may convert a sound into an electrical signal and vice versa. According to an embodiment, the audio 570 may obtain the sound via the input device 550 or output the sound via the sound output device 555 or a headphone of an external electronic device (e.g., an electronic device 502) directly (e.g., using wired line) or wirelessly coupled with the electronic device 501.

The sensor 576 may detect an operational state (e.g., power or temperature) of the electronic device #01 or an environmental state (e.g., a state of a user) external to the electronic device 501, and then generate an electrical signal or data value corresponding to the detected state. According to an embodiment, the sensor 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., using wired line) or wirelessly. According to an embodiment of the present disclosure, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic 579 may convert an electrical signal into a mechanical stimulus (e.g., a vibration or a movement) or electrical stimulus which may be recognized by a user via his tactile sensation or kinesthetic sensation. According to an embodiment, the haptic 579 may include, for example, a motor, a piezoelectric element, or an electric stimulator.

The camera 580 may capture a still image or moving images. According to an embodiment of the present disclosure, the camera 580 may include one or more lenses, image sensors, image signal processors, or flashes.

The power management 588 may manage power supplied to the electronic device 501. According to one embodiment, the power management 588 may be implemented as at least part of, for example, a power management integrated circuit (PMIC). The battery 589 may supply power to at least one component of the electronic device 501. According to an embodiment, the battery 589 may include, for example, a primary cell which is not rechargeable, a secondary cell which is rechargeable, or a fuel cell.

The communication interface 590 may support establishing a direct (e.g., wired) communication channel or a wireless communication channel between the electronic device 101 and the external electronic device (e.g., the electronic device 502, the electronic device 504, or the server 508) and performing communication via the established communication channel. The communication interface 590 may include one or more communication processors that are operable independently from the processor 520 (e.g., the AP) and supports a direct (e.g., wired) communication or a wireless communication.

According to an embodiment of the present disclosure, the communication interface 590 may include a wireless communication interface 592 (e.g., a cellular communication interface, a short-range wireless communication interface, or a global navigation satellite system (GNSS) communication interface) or a wired communication interface 594 (e.g., a local area network (LAN) communication interface or a power line communication (PLC)). A corresponding one of these communication interfaces may communicate with the external electronic device via the first network 598 (e.g., a short-range communication network, such as Bluetooth, wireless-fidelity (Wi-Fi) direct, ultra-wide band (UWB), or infrared data association (IrDA)) or the second network 599 (e.g., a long-range communication network, such as a cellular network, the Internet, or a computer network (e.g., LAN or wide area network (WAN)).

These various types of communication interfaces may be implemented as a single component (e.g., a single chip), or may be implemented as multi components (e.g., multi chips) separate from each other. The wireless communication interface 592 may identify and authenticate the electronic device 501 in a communication network, such as the first network 598 or the second network 599, using subscriber information (e.g., international mobile subscriber identity (IMSI)) stored in the subscriber identification module 596.

The antenna 597 may transmit or receive a signal or power to or from the outside (e.g., the external electronic device) of the electronic device 501. According to an embodiment, the antenna 597 may include an antenna including a radiating element composed of a conductive material or a conductive pattern formed in or on a substrate (e.g., PCB). According to an embodiment, the antenna 597 may include a plurality of antennas. In such a case, at least one antenna appropriate for a communication scheme used in the communication network, such as the first network 198 or the second network 599, may be selected, for example, by the communication interface 590 (e.g., the wireless communication interface 592) from the plurality of antennas. The signal or the power may then be transmitted or received between the communication interface 590 and the external electronic device via the selected at least one antenna. According to an embodiment, another component (e.g., a radio frequency integrated circuit (RFIC)) other than the radiating element may be additionally formed as part of the antenna 597.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 536 or external memory 538) that is readable by a machine (e.g., the electronic device 101). For example, a processor (e.g., the processor 520) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as one or more functions are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 6:
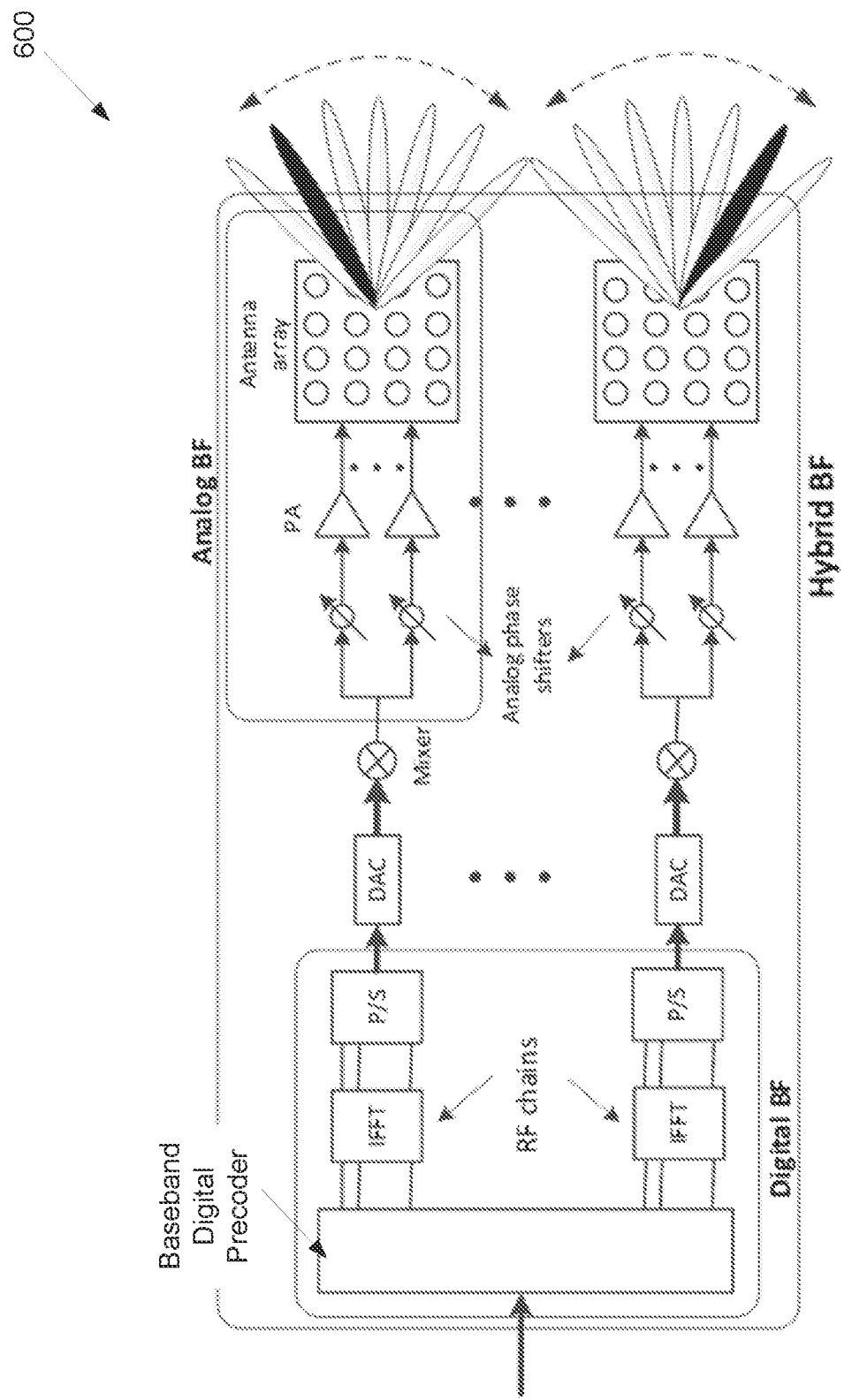
FIG. 6 illustrates an example hybrid beamforming according to embodiments of the present disclosure.

FIG. 6 illustrates an example hybrid beamforming according to embodiments of the present disclosure. An embodiment of the hybrid beamforming 600 shown in FIG. 6 is for illustration only.

For mmWave bands, the number of antenna elements can be large for a given form factor. However, the number of digital chain is limited due to hardware constraints (such as the feasibility to install a large number of analog-to-digital converts/digital-to-analog converts (ADCs/DACs) at mmWave frequencies) as illustrated in FIG. 6. In this case, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across a transmission time interval. The hybrid beamforming architecture as illustrated in FIG. 6 can be applied at the base station and at the UE.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for gNB to provide coverage with a single transmit beam, i.e., ensure adequate received signal quality at all UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at all UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB may form a number of transmit beams, each providing coverage over a region narrower than the overall coverage region but providing the transmit power amplification sufficient to overcome the higher signal propagation loss due to the usage of higher transmit signal carrier frequencies. The UE may also form receive beams to increase the signal-to-interference-and-noise ratio (SINR) at the receiver. Likewise, in the uplink, the UE may form transmit beams and the gNB may form receive beams.

To assist the UE in determining its RX and/or TX beam, a beam sweeping procedure is employed consisting of the gNB transmitting a set of transmit beams to sweep the cell area and the UE measuring the signal quality on different beams using its receive beams. To facilitate candidate beam identification, beam measurement and beam quality reporting, the gNB configures the UE with one or more RS resource (e.g., SS block, periodic/aperiodic/semi-persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (channel quality indication/precoding matrix indicator/rank indicator (CQI/PMI/RI)). Based on the UE's measurement report feedback, the gNB indicates the UE with one or more transmission configuration indicator (TCI) states for reception of PDCCH and/or PDSCH.

In one embodiment, the directionality is required to combat the more severe propagation loss under isotropic antennas at these frequencies. The higher the directionality (equivalently, the narrower the beamwidth is), the better gain it provides and thus higher signal strength. However, the narrower the beams, the higher the overhead for finding the best beam (i.e., beam alignment) becomes.

In one embodiment, with an appropriate beam codebook design, a hierarchical search could require an order of magnitude less in the number of beam measurements as compared to the direct search over the narrow beams.

In one embodiment, in a hierarchical search, the best wide beam (WB) is searched, and then the best children beams (narrow beams; NBs) of that best WB may be found. If the codebook is accurate, the NB selected by the hierarchical search is the same as the best NB (when searched overall all the NBs, and not limited to just the children beams of the best WB).

Figure 7:
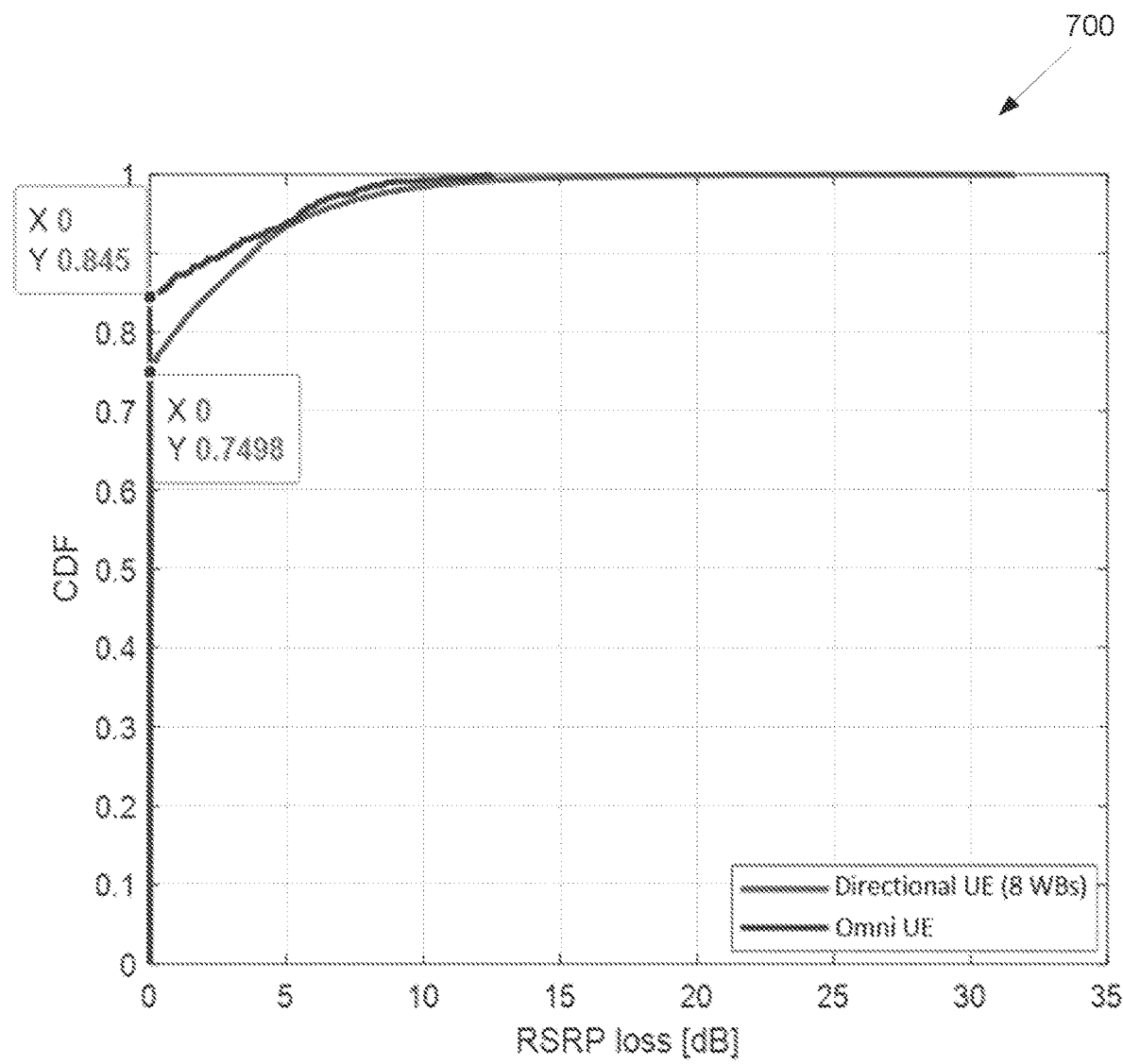
FIG. 7 illustrates an example CDF of a gap in a signal strength of a hierarchical selection method to the best beam selection according to embodiments of the present disclosure.

FIG. 7 illustrates an example cumulative distribution function (CDF) of a gap in a signal strength of a hierarchical selection method 700 to the best beam selection according to embodiments of the present disclosure. An embodiment of the CDF of a gap in a signal strength of a hierarchical selection method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

Specifically, in one example, even in the best-case scenario, it may be found that the codebook is only accurate for about 85% of the times assuming a user with isotropic antenna (e.g., omni user). For a directional user, the accuracy of the codebook may be degraded further to around 75% as shown in FIG. 7. The reason for this degradation is due to the coupling between the user's codebook and the base station's codebook. As shown in FIG. 7, the gap in the signal strength can be quite severe, e.g., more than 20 dB in this case. Also, this hierarchical accuracy not only depends on the codebook design itself, but this hierarchical accuracy also depends on the physical environment this hierarchical gNB operates in. For example, a codebook that is very accurate in cell A may not be as good when operating in cell B, due to the differences in the spatial signature of the propagation environments. Due to this coupling of the various factors, it is difficult if not impossible to achieve a universally accurate codebook on all deployment environments.

As illustrated in FIG. 7, CDF of the gap in the signal strength of a hierarchical selection method to the best beam selection is illustrated. The gap of 0 dB means the hierarchical structure holds, and thus for this example, the hierarchical codebook is 75% accurate on all the locations under the base station's coverage.

In TABLE 1, simulated beam management following the 3GPP specifications (release 15) is shown. As shown in TABLE 1, it is noted that hierarchical base stations perform better at high speed compared to base stations that use only narrow beams (denoted by pure-NB in the table). The performance metrics shown here is the RSRP loss in dB, defined to be the difference of the simulated scheme to the best beam pair at each time slot. In the present disclosure, 3 representative cases according to the temporal changes. "static" refers to static UE with only rotation of the device, "slow" refers to UE with a speed of 30 km/h, and "fast" refers to the UE with a speed of 60 km/h. The first column "hier" refers to the simple hierarchical beam operation, the second column "hier. enh" refers to a method following one of the embodiments described in this disclosure. It may be noted that the proposed enhanced scheme seems to strike a good balance that the proposed enhanced scheme works well at all the three speed levels.

At slow speeds, the enhanced scheme can more accurately search resulting in less RSRP loss compared to the simple hierarchical operation. At high speeds, the use of WBs helps the maintenance of the alignment easier than using the narrow beams only, resulting in more tolerance to speed increase. The enhanced solution requires some additional delay to expand the search for more accurate NB, and thus the performance of enhanced solution can degrade compared to the simple hierarchical operations. In the present disclosure, however, only a non-negligible degradation is shown at the 1%-tile RSRP gap.

TABLE 1

| Hierarchical base stations | | | | |
|---|---|---|---|---|
| Metrics | | Hier. | Hier.Enh | Pure-NB |
| Average RSRP loss | Static | 2.221 | 1.687 | 0.725 |
| | Slow | 2.735 | 2.208 | 1.919 |
| | Fast | 4.324 | 3.843 | 4.388 |
| RSRP gap to Pure-NB at 5%-tile | Static | 2.494 | 1.703 | 0 |
| | Slow | 1.280 | 0.948 | 0 |
| | Fast | 0.129 | −0.348 | 0 |
| RSRP gap to Pure-NB at 1%-tile | Static | 3.826 | 2.389 | 0 |
| | Slow | −2.310 | −2.287 | 0 |
| | Fast | −3.439 | −2.524 | 0 |

Specifically, it may be observed that under the following two conditions, it is relatively likely that the codebook accuracy does not hold for that instance: (1) small difference between the measured signal strengths of the best WB and second best WB; and (2) measured signal strength of the NB found by hierarchical search is lower than that of the best WB.

It should be noted that these two conditions are not independent, and the two condition do not provide 100% detection. The false detection of the hierarchical inaccuracy situation can result in wasted measurement resource in one solution provided in the present disclosure. The solution provides a tradeoff between the measurement overhead and the performance (i.e., the signal strength of the beam found by the search). The operator can select the appropriate tradeoff to meet their performance requirements.

FIG. 8 illustrates an example timing structure 800 according to embodiments of the present disclosure. An embodiment of the timing structure 800 shown in FIG. 8 is for illustration only.

In one embodiment, a description of the timing structure of the assumed system is provided. It may be assumed that that there are measurement opportunities available periodically. One example illustration of the timing is shown in FIG. 8.

FIG. 8 assumes that there is one round of measurement opportunity ("round" refers to the full cycle of WB and NB measurements with the associated feedback and control signaling.), and there is some gap between each opportunity. If the SS blocks are transmitted on the WBs, the WBs can be configured to be measured and reported by the UE via configuration of SS blocks measurement and reporting for L1-RSRP and/or L1-SINR.

The configuration of CSI-RS for the UE to measure the WBs and report the measurement results is also possible if CSI-RS is transmitted on the WBs. A separate CSI-RS can also be configured to the UE to measure the NBs and report L1-RSRP, L1-SINR or CSI. This is just an example, and it is not required by the solutions provided in the present disclosure. The system could provide multiple rounds of measurement opportunities, and all the opportunities could be packed back-to-back. Also, note that the NB measurement opportunity may be enough for measuring the children of one WB or the NB measurement opportunity could be larger and allow the measurements of the children of two or even more WBs. For ease of description, it may be assumed that timing as illustrated in FIG. 8 in subsequent descriptions of the present disclosure and each NB measurement opportunity are only enough for measuring the children of one WB.

As illustrated in FIG. 8, the system provides periodic beam measurement opportunities. In this example, there is one opportunity for measuring WBs and one opportunity for measuring NBs. There are also feedback/control signals for the base station and the user to exchange messages so that the base station and the user can inform each other of the measurement results and beam search outcome. In this example, a gap between these opportunities is assumed, and each gap could be used for data transmission. This, however, is just an example and it is not required; all these measurement/feedback opportunities could be packed back-to-back.

In the present disclosure, a baseline hierarchical search work is provided and one or more embodiments provided in the present disclosure are built on top of this straightforward baseline to provide mechanisms in order to mitigate the impact of codebook inaccuracy. The baseline search work is provided in the downlink, with the understanding that the same procedure can be straightforwardly applied in the uplink as well. In the baseline search, first all the WBs are measured. The user then feedbacks the measurements to the base station. In the baseline search, only the WB index of the strongest WB is needed at the base station. Once the best WB is found, the children beams of that best WB (assuming the children beams are NBs) are measured. The user may report the measurements of the NBs and the base station could make a decision and inform the user accordingly which beam may be used for the transmission. It is noted that the solution provided in the present disclosure does not make any assumption on the user's codebook (e.g., omni or directional).

FIG. 9 illustrates a flowchart of a method 900 for mitigating the impact of the codebook inaccuracy according to embodiments of the present disclosure. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

In one embodiment, building on top of these basic system descriptions, an overall flow is provided as illustrated in FIG. 9. In this embodiment, using up to two rounds of beam measurements are provided to make the final beam selection if a certain condition is met. The condition here is designed to detect if the codebook hierarchical structure is inaccurate. The details of the criteria for this detection will be provided later. At the start of the beam search, the WBs are measured at step 902. Then, the user feedbacks the measurements. In this embodiment, the user is required to report more than one WB measurements results (both the beam indices and the signal strengths of at least 2 best WBs, e.g., in RSRP or SINR).

Next, the base station may sweep the children beam of the best WB reported by the user (called WB1). Once the measurements of the children beam are done at step 904, the user may feedback to the base station the best NB measurement (both the beam index and the signal strength, e.g., in RSRP or SINR). Using the WB and NB measurement reports, the base station determines if the codebook hierarchical structure is likely inaccurate for the user (e.g., "qualifying condition") at step 906. If the answer is negative, the base station makes a determination that the found NB is likely good enough, and the base station may select that best NB among the children beams of WB1 at step 908. If the answer is yes, the base station makes a determination that it is likely that the hierarchical accuracy of the codebook is inaccurate for the user and the hierarchical accuracy of the codebook may continue the search without making a final beam selection yet.

Due to the assumed timing structure, the second part of the search also starts with the WBs measurements at step 910. Note that if the temporal variation is not too fast, this new set of WB measurements may not provide new information, and the candidate WB may be the same as from the first part. In this case, the procedure first chooses at step 912 another WB (called WB2) as a candidate for the additional search, and the base station and the user may proceed to measure the children beams of WB2 at step 914. The determination of which WB may be WB2 may depend on the adopted qualifying condition, and the details will be provided in the subsequent descriptions. A simple choice is to select the second best WB as WB2 at step 916. Once the measurements of the children of WB2 and the corresponding reporting have finished, the base station may make the final selection among the measurements of the children of WB1 and WB2. A simple selection criterion is to select the NB with the strongest signal strength among the children of WB1 and WB2. Finally, the method 900 ends at step 918.

In one embodiment, a criterion for detecting the "qualifying condition" is provided. In the present disclosure, it may be found that there are two conditions that have strong correlation with the inaccuracy of the codebook: (1) the difference in the signal strength between the strongest WB and the second strongest WB is smaller than some threshold; and (2) the signal strength of the best child NB is lower than that of the best WB.

The two conditions are not independent or complementary. In fact, if the threshold for determining the condition 1 is set to a large enough value, the threshold can cover all occurrences that meet condition 2 as well. This does not mean that selecting a large threshold for condition 1 is a "better" choice; by selecting a larger threshold, it may detect more cases but there are also more false-alarms detected. A moderate value of the threshold is often desirable to balance the miss-detection rate and the false-alarm rate. With a moderate threshold values (e.g., between 1-5 dB), it is likely that condition 2 can help improve the detection accuracy and the two conditions can be used together. It should also be noted that for condition 2, a margin for the detection could be incorporated to combat noisy measurements, if the noise is expected to be non-negligible. In that case, the condition would be that the signal strength of the best child NB is lower than that of the best WB by the selected margin. This margin could be selected according to the noise level (e.g., 1 to 3 standard deviation of the noise).

Having identified these two conditions and recognized that the two conditions could overlap but not completely, there are several choices for implementations, e.g., using both conditions or using only one of them. There are pros and cons to each choice, and the pros and cons may be selected according to the operating environment as well as the desired performance.

From the objective of trying to get the most accurate alignment as possible, it is desirable to catch all cases where the codebook is inaccurate. For this objective, using the two conditions with an OR logical operator would fit well. Note, this is meaningful for a moderate choice of the threshold for condition 1 because if this threshold is too large it may already cover all cases to be detected by condition 2. The downside of this, however, is that likely the false-alarm for detecting codebook inaccuracy may increase. This means that there likely be an increase in the frequency of unnecessary delayed beam switches by one round of WB and NB measurement (as defined in FIG. 8). While this likely results in little or negligible impact in an environment with slow temporal variation, it could become problematic in a fast changing environment where frequent beam switches can be expected.

For a fast changing environment, a more stringent detection conditions than the OR condition may be desirable. Possible choices include using only one of the two conditions or using both conditions with an AND logical operator. The other extreme from using OR with the two conditions is the use of AND logical operator, which is the most stringent. This likely has the least occurrences of the false-alarm in detecting the codebook inaccuracy. This could help in eliminating the unnecessary delayed beam switches, which is good for a fast changing environment. But at the same time, miss-detection of the codebook inaccuracy may increase. This means the alignment accuracy could be compromised and could become problematic at the slow speed.

One advantage for using condition 1 is the flexibility it provides by adjusting the threshold for the detection. It could even be adjusted accordingly to the user. E.g., if it is possible to obtain speed information from the user, the base station could select a smaller threshold for a fast speed, and the base station could select a larger value for a slow speed. Note that when condition 1 is used, the determination about the codebook inaccuracy is based only on the measurements of the WBs only. Thus, in this case the decision block "qualifying condition detected?" in FIG. 9 (e.g., step 906) can be moved to be in front of the block "measure the children beams of the best WB (e.g., WB1)."

Figure 10:
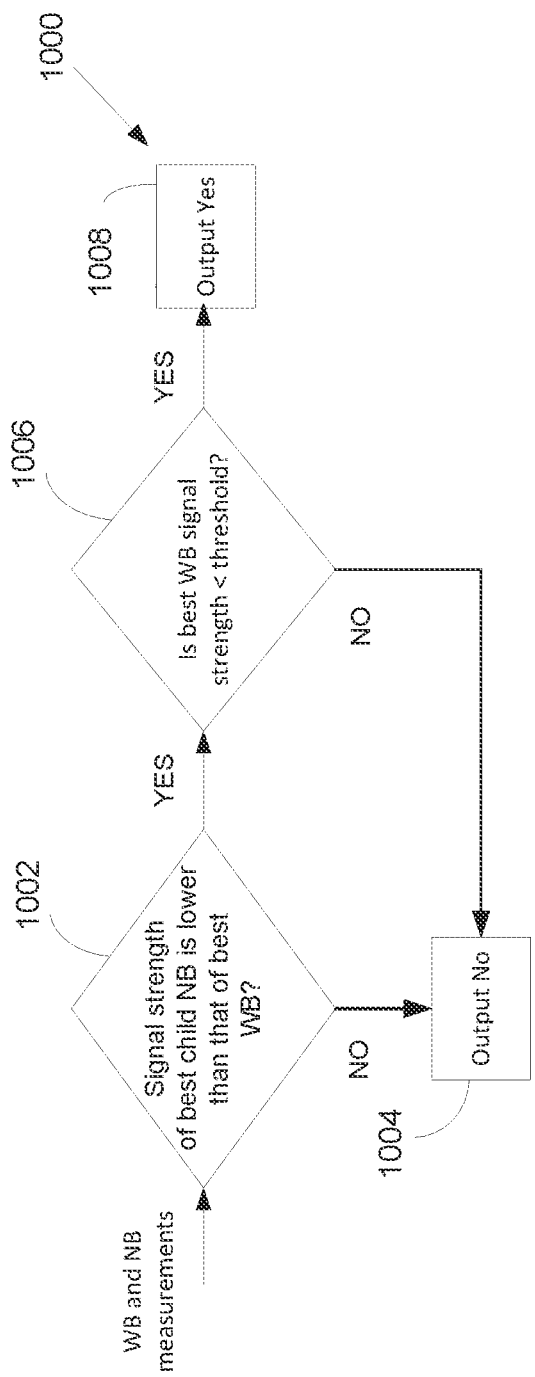
FIG. 10 illustrates a flowchart of a method for detecting codebook inaccuracy occurrence according to embodiments of the present disclosure.

FIG. 10 illustrates a flowchart of a method 1000 for detecting codebook inaccuracy occurrence according to embodiments of the present disclosure. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

It is also possible to use condition 2. For the objective of trying to avoid unnecessary delayed beam switch as much as possible, a slight modification may be provided to condition 2 as shown in FIG. 10. Note that this may be used to replace the "qualifying condition detected?" decision block in FIG. 9. Here, when the original condition 2 is met, there is one more check of the signal strength of the WB against some predetermined threshold. This threshold could be selected according to a minimum required signal strength for operation (e.g., required by the user's application). In this case, if the found best WB happens to have a signal strength exceeding this minimum threshold, then rather than continuing the search that requires a delayed beam switch, it may be desirable to use the WB instead.

Note that it is also possible for any use of the adjustment for condition 1 or condition 2 as described earlier in combination with other cases. The desired adjustment, however, could be set accordingly to how the condition 1 or the condition 2 is used (e.g., when the condition 1 or the condition 2 used in a standalone manner versus when the condition 1 or the condition 2 used together).

As illustrated in FIG. 10, at step 1002, the method 1000 determines whether signal strength of best child NB is lower than that of best WB. If no, the method 1000 outputs "no"; otherwise, the method 1000 determines at step 1006 whether best WB signal strength is less than a threshold. At step 1006, if no, the method 1000 performs step 1004; otherwise, the method 1000 outputs "yes" at step 1008.

Finally, the idea for modifying the condition 2 in FIG. 10 could also be applied to the overall flow. This is a good option when avoiding the unnecessary delayed beam switch is prioritized, which may be a preferred choice under a fast changing environment. The modified overall flow is shown in FIG. 11.

Figure 11:
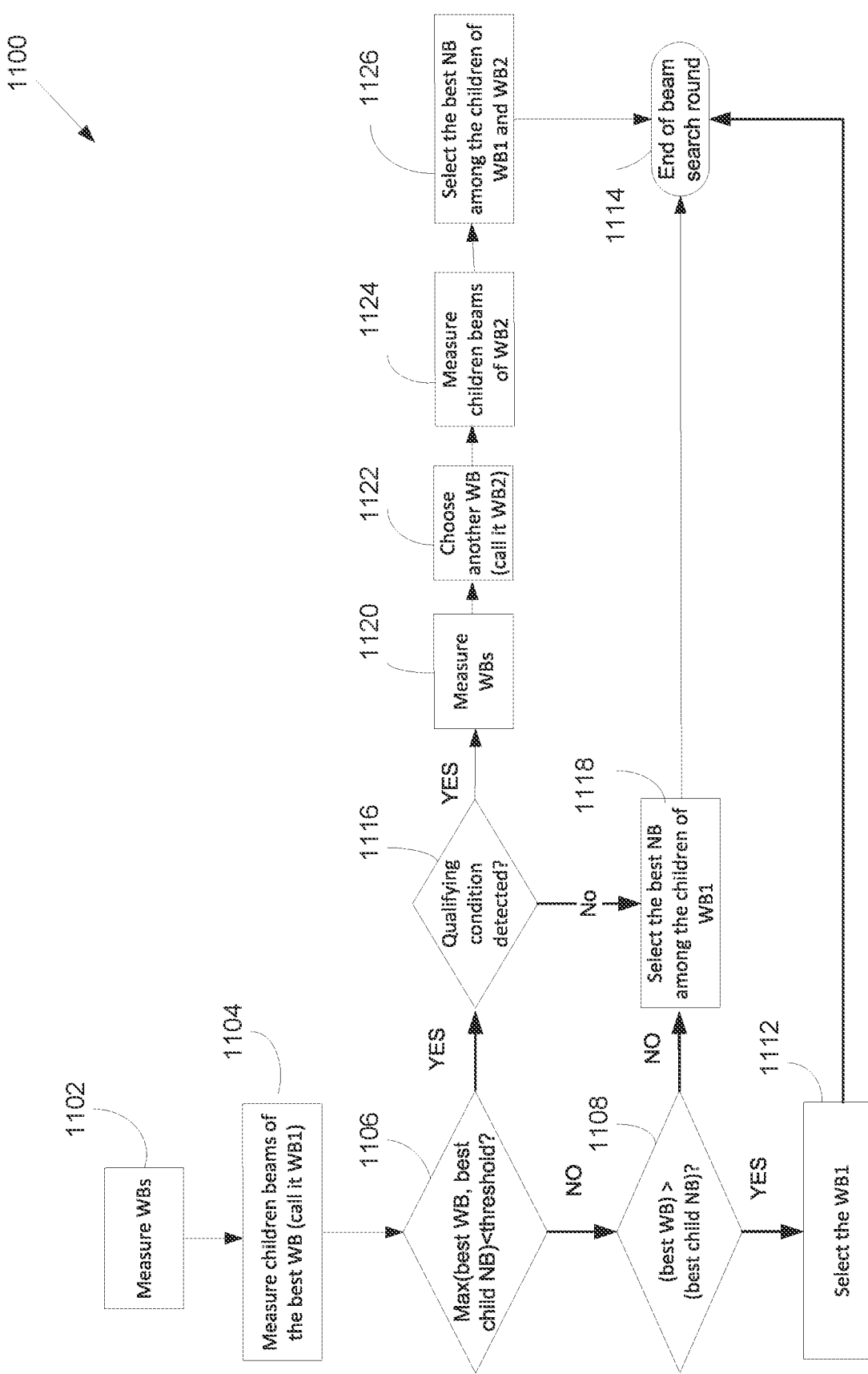
FIG. 11 illustrates a flowchart of a method for mitigating the impact of the codebook inaccuracy according to embodiments of the present disclosure.

FIG. 11 illustrates a flowchart of a method 1100 for mitigating the impact of the codebook inaccuracy according to embodiments of the present disclosure. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

FIG. 11 illustrates a modified overall procedure for mitigating the impact of the codebook inaccuracy. In one example, avoiding unnecessary delayed beam switch is prioritized by not doing the detection for the inaccuracy if the currently found beam can already provide signal strength beyond a certain level.

As illustrated in FIG. 11, the idea is that if the already found beam (either the best WB or the best child NB of the best WB) can provide signal strength in exceed of the minimum requirement, then the codebook inaccuracy detection may be altogether skipped. To enable this, in the modified overall flow, after obtaining the WB and NB measurements at steps 1102 and 1104, it is determined at step 1106 if either the best WB or the best child NB of the WB is larger than the threshold or not. The threshold may be set to some minimum level of signal strength needed to meet some minimum performance requirement. If this minimum signal strength is already met, the stronger one among the best WB or the best child NB can be selected at step 1108, and the base station may make the beam switch decision to the selected beam at step 1112. In this modified flow, the delayed beam switch with the enhanced beam search is only conducted only when the minimum signal strength cannot be satisfied and the conditions for codebook inaccuracy detection are met. At step 1116, if qualifying condition is not detected the method 1100 selects the best NB among the children of WB 1 at step 1118; otherwise, the method 1100 measures WBs at step 1120. In step 1108, if best WB is not greater than best child NB, the method 1100 performs step 1118. At step 1122, the method 1100 choose another WB (e.g., WB2) and measures children beams of WB2 at step 1124. At step 1126, the method 1100 selects the best NB among the children of WB1 and WB2 and ends the beam search round at step 1114.

The aforementioned embodiments use only the measurements of the best and second best WB. This requires the least amount of information to be reported from the user to the base station. If the feedback channel is flexible and can allow the reporting of more than two WBs, that information could be leveraged for a more accurate detection of the codebook accuracy. Note the limitation of this reporting could come from the specification of the communication standard and/or from the limited data rate of the feedback/control channel.

With more WB measurement reports, a more elaborate detection of the codebook inaccuracy could be designed. For the sake of the description, it may be assumed that the user reports k WBs in each measurement round, with k≥2. The report includes the indices of the WBs and their signal strengths. Note that k=2 is also allowed, and the described embodiment can be applied similarly to the earlier setting; for example, with 2 WB measurements report. The solution here can be used to replace the decision block "qualifying condition detected" in the embodiments described so far such as those in FIG. 9 and FIG. 11.

Figure 12:
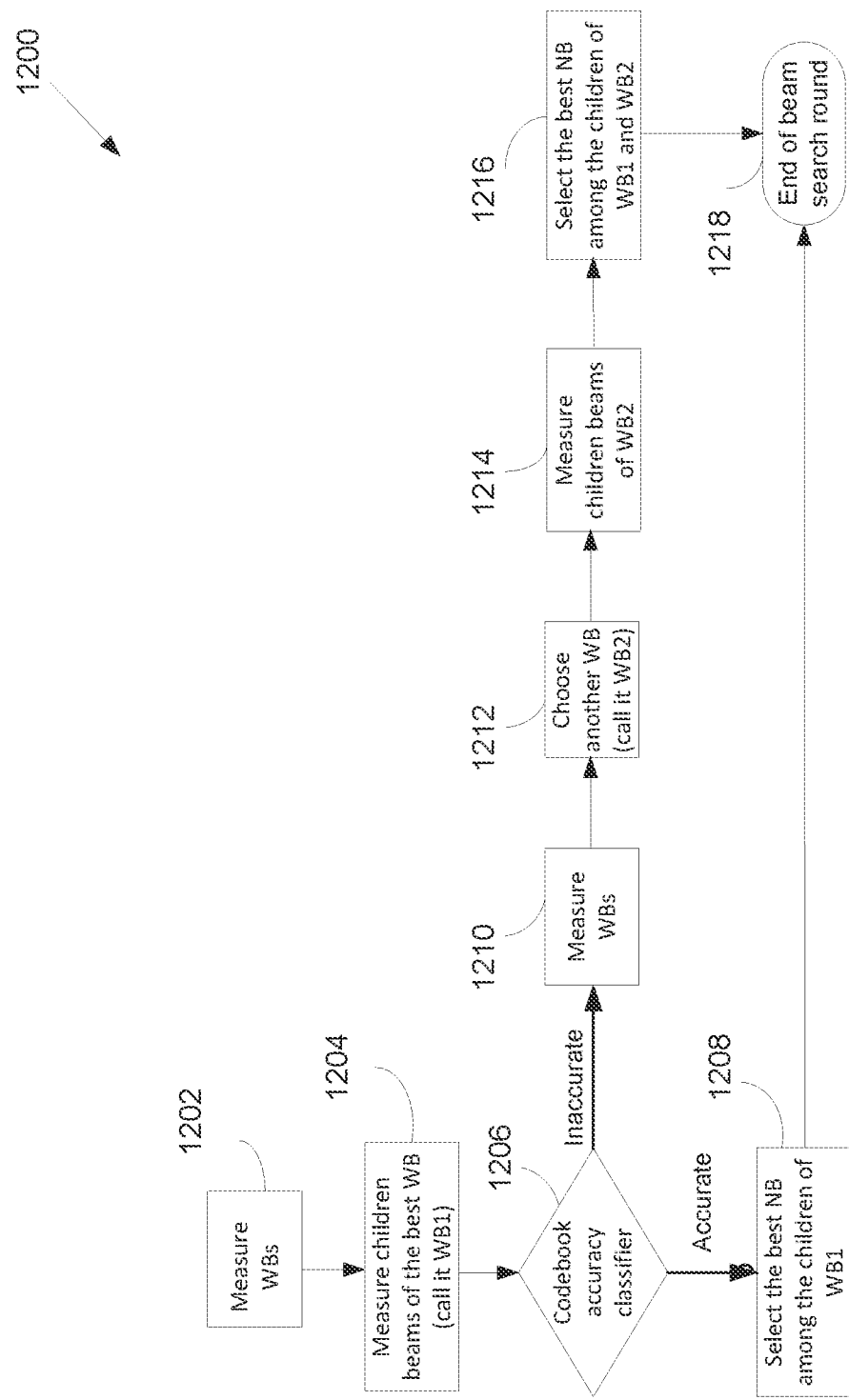
FIG. 12 illustrates a flowchart of a method for using a machine learning classifier for detecting the codebook accuracy according to embodiments of the present disclosure.

FIG. 12 illustrates a flowchart of a method 1200 for using a machine learning classifier for detecting the codebook accuracy according to embodiments of the present disclosure. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

An example of such a replacement for the flow of FIG. 9 is shown in FIG. 12. Regarding the selection of the k WBs to be reported, a simple criterion is to select the k strongest WBs seen by the user. It should be pointed out that it may not make any assumption on the codebook of the users, and thus these k WBs could be measured by different user's beam. Other selection criteria for selecting the k beam can also be used; it is only required that the criterion be consistently used in the system.

FIG. 12 illustrates an overall flow to use a machine learning classifier for detecting the codebook accuracy.

This detection task with k WB measurements is a binary classification problem: codebook inaccuracy detected or not detected. The solution here uses a machine learning solution to do the classification.

In one embodiment, an overall view of the solution is provided and then how to obtain the data for training the binary classifier is provided. In such embodiment, any classifier model could be used, including but not limited to a K-nearest-neighbor, a support-vector-machine, a random forest, or an artificial neural network. The information available at the time of inference using the classifier includes the k WB measurements and the best child NB of the best WB. With this in mind, there are several options for defining the classifier model.

In one example, if the condition 1 is replaced by a trained classifier, only the WB measurements is used as the input. Another option is to include both the WB measurements and the WB indices. If the condition 1 and condition 2 are replaced with one classifier, then both the WB measurements and the best child NB measurement may be included. Again, with or without the beam indices could be used. Now regarding the shaping of the input, different choices could be used depending on the choice of the classifier model.

In one example, for the beam indices, the actual indices used by the base station could be used (i.e., a beam index is represented by an integer) or the actual indices could be represented by a one-hot encoding. Similarly, there is no preferred choice of the ordering either in general, though that may depend on the choice of the classifier model. Regarding the signal strength measurements, there could be some advantage to do some normalization. One approach is to normalize against the strongest WB.

Assuming that the dB (or logarithmic) scale is used for the signal strength measurements, this normalization step is to take the difference to the signal strength of the strongest WB. There are several advantages to doing this. As hinted by the description of condition 1, what matters is the relative strength between the best and second best WB and not their absolution signal strength. Another point is that with this normalization, the dependence on the transmit power can be eliminated as well as the dependence on the gain of the user's beam pattern. It may be noted that this normalization is separate for the normalization typically used in a machine learning solution to facilitate the training process. Such a normalization could be applied on top of the power normalization as the aforementioned embodiments for examples.

As illustrated in FIG. 12, the method 1200 measures WBs at step 1202. In step 1204, the method 1200 measures children beams of the best WB (e.g., WB1). In step 1206, the method 1200 determines whether the codebook is accurate using the codebook accuracy classifier. In step 1206, if accurate, the method 1200 selects the best NB among the children of WB1; otherwise, the method 1200 measures WBs at step 1210. At step 1212, the method 1200 chooses another WB (e.g., WB2) and measures children beams of WB2 at step 1214. The method 1200 at step 1216 selects the best NB among the children of WB 1 and WB2. At step 1218, the method 1200 ends the beam search round.

In one embodiment, how to obtain training data for training the classifier is provided. There are three inputs needed to generate training data: (1) the base station's beam patterns, (2) the user's beam patterns, and (3) the propagation channels. It may be assumed that the measured beam patterns of the base station's codebook are available. If such beam patterns are not available, an approximation using an antenna simulation software package could be used with the understanding that some degradation in the performance can be expected. In any case, it may be assumed that the beam patterns are available, either from measurements or any other approximation.

For the user's beam patterns, because it is outside the control of the base station side, it is desirable to have several types of user's beam codebooks, e.g., with different number of beams. The point is to get some diversity in the user's codebooks such that typical ones are likely captured in the training dataset. In the special case where the target user's codebook (or codebooks if there are several known targets) is known, then the training set could be tailored to that codebook (or codebooks) only.

The beam patterns are used to generate the beam measurements (of both the WB and NB) for some channel models. Different types of channel models could be used. For example, if a site-specific model is desirable and affordable, a model of that site could be constructed in some ray-tracing simulator and compute the propagation channels for all the points under the coverage in that site. If the model is expected to work across various sites, multiple of those sites could be included or some generic sites that are readily available to be used in ray-tracing simulator may be used. The point here would be to get a good coverage of the typical sites to be deployed in. Yet another possibility is to use a statistical model that can provide at least the angle of arrival (AoA) and angle of departure (AoD), and the path gain.

Figure 13:
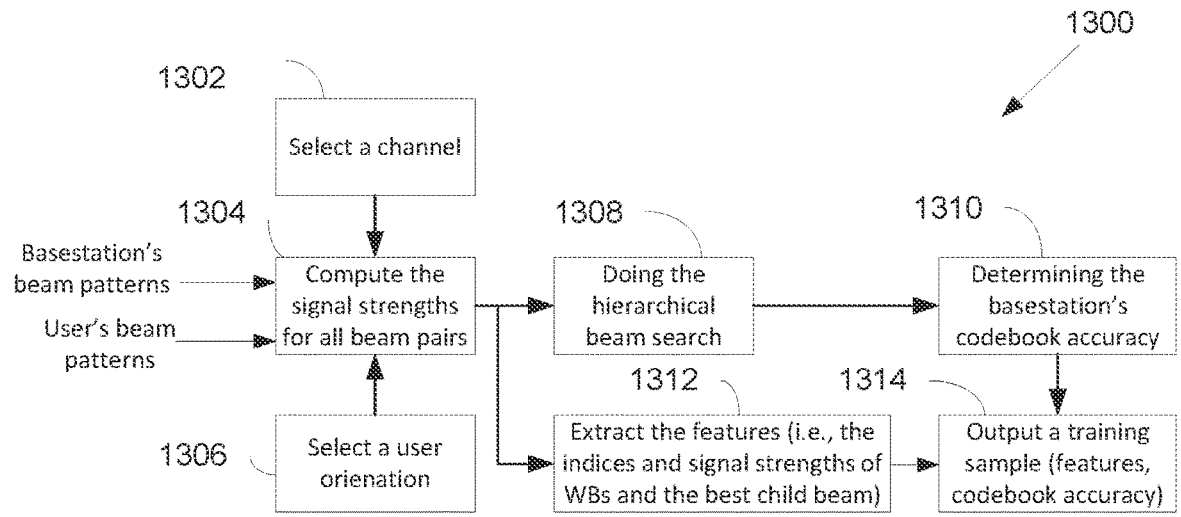
FIG. 13 illustrates an example procedure to compute a training data sample for a selected propagation channel and a selected user's antenna orientation according to embodiments of the present disclosure.

FIG. 13 illustrates an example method 1300 to compute a training data sample for a selected propagation channel and a selected user's antenna orientation according to embodiments of the present disclosure. An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

Once the three components are available, it is ready to generate the training data samples. FIG. 13 shows the steps to get a training sample for a selected channel and user's orientation. The procedure in FIG. 13 could be repeated for different channels and user's orientations to generate the training data set. In this procedure, first the channel and the user's orientation is selected at steps 1302 and 1306, respectively. This selection can be a random selection. The next step is to synthesize them to obtain the receive power for each base station and user beam pair at step 1304. Various ways to compute this are available in the literature with different sophistication. For example, one approach would be to compute the whole physical layer simulation from the waveform generation, and the radio frequency (RF) components modeling such as the power amplifier. Another approach would be to compute the integration of the power angular profile of the channel (by ignoring the delay) and the beam patterns. For purpose of the present disclosure, any of embodiments or examples are acceptable as long as the embodiments or examples reflect the relation between the AoA/AoD and the beam patterns. For each channel sample, one or more user antenna orientations could be incorporated.

Once the signal power for all the beam pairs are computed, at step 1308 the hierarchical beam search is computed. One method would be to check the signal strength of all the base station WBs and all the user's beams combinations and then identify the strongest pair. The base station WB of that best pair is the best WB. Then, the procedure finds the best child beam of the best WB at step 1312. This provides the features for training samples. The features are the signal strengths of the strongest k beam pairs (from the combinations of the base station's WBs and the all the user's beams), the indices of those k WBs, and the best child NB signal strength and an index of the best child NB signal strength. For simplicity, the selection of the k WBs is described by the signal strength, but as mentioned earlier, any selection method is acceptable as long as it is consistently used. Also, regarding the user beam selection for search during of the child NB, a simple choice would be to use the user's beam corresponding to the best WB.

It may be desirable to have multiple criteria for the user's beam selection to have some diversity in the training data as stated earlier regarding the user's codebook. At step 1310, the method 1300 determines the base station's codebook accuracy (which is used as the label for the training sample) and outputs a training sample (e.g., features, codebook accuracy) at step 1314. A binary value indicating whether the codebook is accurate or not is used as the label. The codebook accuracy is determined by checking if the best child NB (the strongest NB among the children beams of the best WB) is the best NB or not (the NB that provides the highest signal strength when searching over all base station's NB and user's beam combinations).

Similar to the aforementioned embodiments, a machine learning solution may be used for selecting WB2 to maximize the likelihood of finding the best beam. The setup of this is similar to the classifier for determining the accuracy of the codebook but with a few significant differences. First, for the input there are some additional measurements of the WBs in the second round that are also available for use. For a slow changing environment this may add little value, but it could become significant in a fast changing environment.

In one embodiment, the slow changing environment and the fast changing environment are provided.

In one embodiment of a slow changing case, the information from the WB measurements in the second round may have little useful information and thus those measurements may be ignored. In that case, the input for the classifier here may be the same as those aforementioned embodiments for the classifier for determining the accuracy of the hierarchical codebook of the base station. Another option is to throw away the WB measurements from the previous round and replace them with the new measurements instead. Secondly, the output is also different. The output in this case is the beam index of W2. For the training data, in this case, the label of the class needs to be changed. Instead of the binary indicator of the codebook accuracy, the label here is the WB index that contains the best NB (i.e., the NB that provides the highest signal strength when searching over all base station's NB and user's beam combinations).

Figure 14:
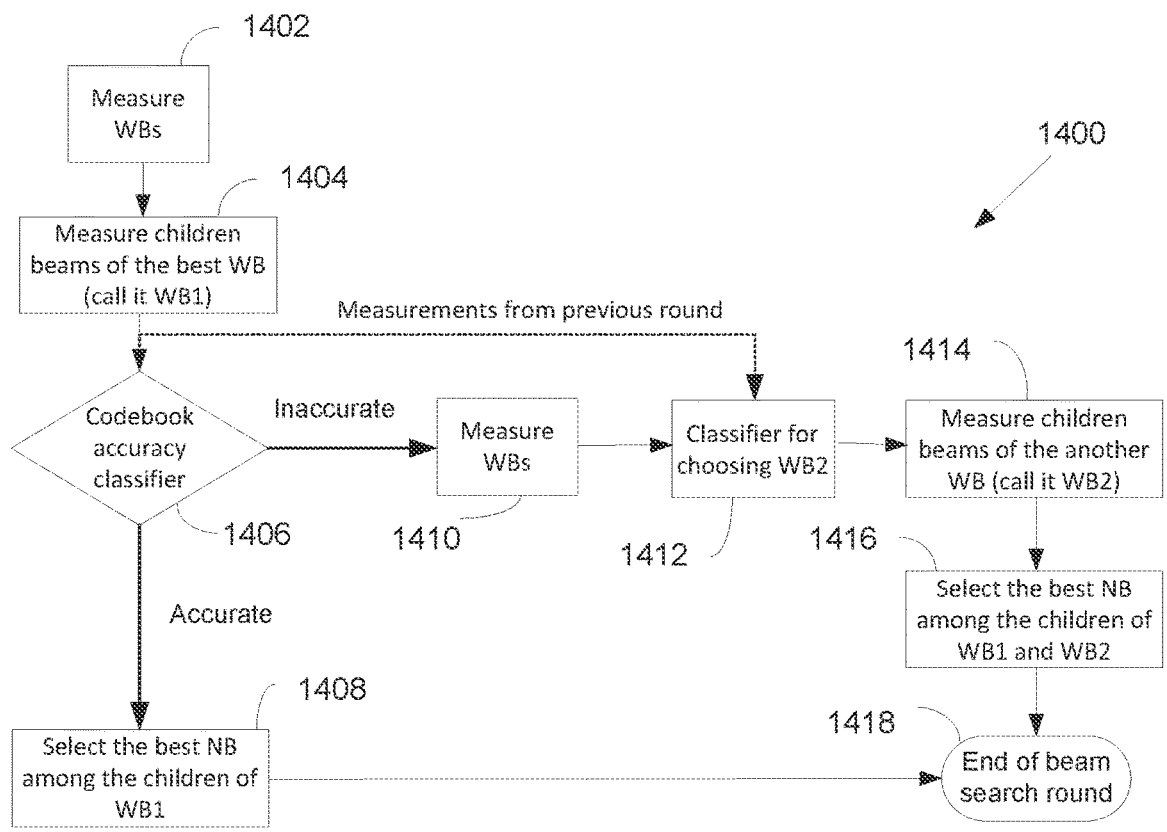
FIG. 14 illustrates a flowchart of a method for detecting codebook inaccuracy occurrence using a classifier for select WB2 according to embodiments of the present disclosure.

FIG. 14 illustrates a flowchart of a method 1400 for detecting codebook inaccuracy occurrence using a classifier for select WB2 according to embodiments of the present disclosure. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. How this operation fits into the overall flow is shown in FIG. 14, where dashed arrow denotes the fact that the selection of WB2 by the classifier may use measurements from the previous round at the input. Lastly, it may be mentioned that with this approach, it is straightforward to extend the overall search to more than two rounds. Separate classier could be trained for each of the round until a certain condition is met, e.g., when the found NB exceeds some threshold or when the maximum number of rounds allowed is met.

FIG. 14 illustrates a modified overall flow building on top of the flow of FIG. 10 by using a classifier for select WB2 to be searched in the next round of measurements.

As illustrated in FIG. 14, the method 1400 measures WBs at step 1402 and measures children beams of the best WB (e.g., WB1) at step 1404. At step 1406, the method 1400 determines accuracy using a codebook accuracy classifier. If accurate, the method 1400 selects the best NB among the children of WB1 at step 1408 and ends the beam search round at step 1418; otherwise (inaccurate), the method 1400 measures WBs at step 1410. At step 1412, the method 1400 chooses WB2 using a trained classifier. At step 1414, the method measures children beams of another WB (e.g., WB2) and selects the best NB among the children of WB 1 and WB2, and then ends the beam search round at step 1418.

Figure 15:
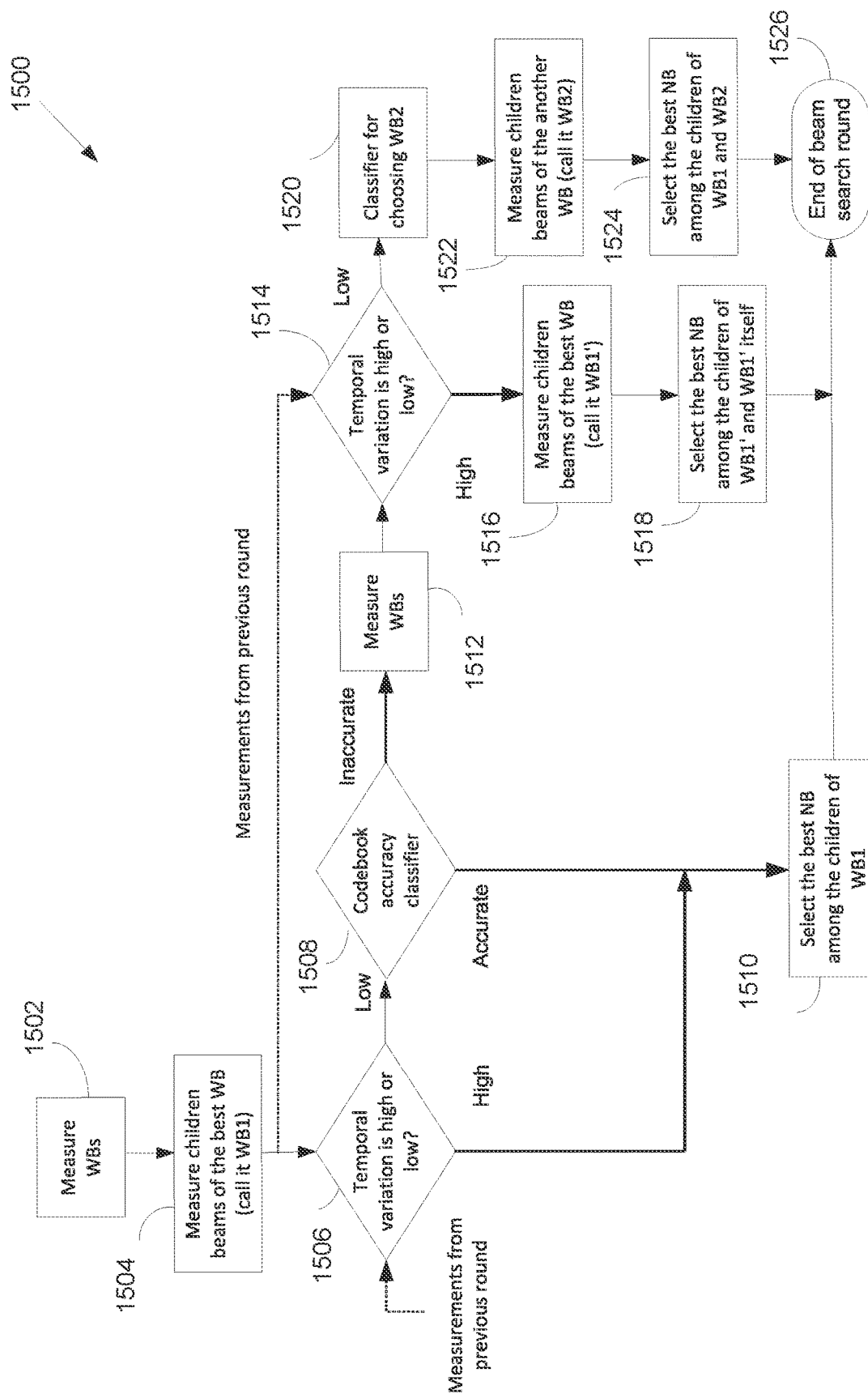
FIG. 15 illustrates a flowchart of a method for operating environment according to embodiments of the present disclosure.

In one embodiment, an operation where the temporal variation between the measurement rounds may be non-negligible is provided. The embodiment is illustrated in FIG. 15. In this case, it may be required to estimate the state of the current environment to determine if the operation environment has a high temporal variation or a low temporal variation. The temporal variation could be set to "high" at the start of the operation when there is no measurements prior to the first round of measurement. The main idea here is to attempt the codebook inaccuracy mitigation only when a low temporal speed variation is detected. The rationale for this goes as follow.

Under the high temporal variation, likely the enhancement to mitigate the impact of the codebook inaccuracy may have limited success if not harmful; e.g., because the measurements from the previous measurement round cannot be guaranteed to stay valid when making the beam change decision in the next round. FIG. 15 shows an example implementation of this idea. First, the WB and the children NBs of the best WB are measured. Then, the temporal variation state is estimated to see if the environment is a high or low temporal variation. This step needs the measurements of the current round and the prior round.

If the temporal variation is high, the procedure may make the beam change decision based on the measurements in the current round only. If the temporal variation is low, the procedure proceeds to detect if codebook inaccuracy may occur. If it is determined to be inaccurate, then the WBs are measured and the temporal variation speed may be estimated. If the temporal variation becomes high at this round, then the procedure may select the best WB based on this current round (denoted by WB1' which may or may not be the same as WB1 in the prior round). After that the children NBs of WB1' are measured and a beam change decision is made. If the temporal variation is still low, WB2 is selected and children NBs of the WB2 are measured. The beam change decision is based on the measurements of this round and the prior round in the same manner as described in earlier embodiments.

FIG. 15 illustrates a flowchart of a method 1500 for operating environment according to embodiments of the present disclosure. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. FIG. 15 illustrates an operating environment that could have high or low temporal variation.

As illustrated in FIG. 15, the method 1500 at step 1502 measures WBs and measures children beams of the best WB (e.g., WB1) at step 1504. At step 1506, the method 1500 determines whether temporal variation is high or low. If the variation is high, the method 1500 selects the best NB among the children of WB1 at step 1510; otherwise (low) the method 1500 determines an accuracy at step 1508. If accurate at step 1508, the method 1500 performs step 1510; otherwise (inaccurate), the method 1500 measures WBs at step 1512. At step 1514, the method 1500 determines temporal variation is high or low. If high, the method 1500 measures children beams of the best WB (call is WB1') and selects the best NB among the children of WB1' and WB1' itself. At step 1514, if higher, the method 1500 performs classification for choosing WB2 at step 1520 and measures children beams of another WB (e.g., WB2) at step 1522. At step 1524, the method selects the best NB among the children of WB1 and WB2 and ends the beam search round at step 1526.

In one embodiment, how to determine the state of the temporal variation is provided. Heuristic rules or machine learning based solutions could be adopted. For example, as a heuristic rule, one could check the closeness in the measurement results reported in the prior round and the current round. Consider using the WB measurements. In that case, the measurements could be stacked into a vector. Then, the distance between this measurement vector of the current round to the previous round is used.

Various distance measures could be used including but not limited to the Euclidean distance, the L-infinity distance, any L-p distance in general, and a cosine distance. For the machine learning approach, the same input may be used as described in the aforementioned embodiments (i.e., the one determining the codebook inaccuracy and the one for selecting WB2).

The question then would be now to obtain a label for the training data. The label could be generated by attempting the codebook inaccuracy mitigation and if the end-result is better than not doing the mitigation, the state is labeled as "low," otherwise the state is labeled as "high."

Note that technically speaking, this classifier is not strictly limited to the temporal variation but it also relates to the codebook accuracy, but this labeling may provide the desired result. In fact, realizing this point, another alternative implementation in FIG. 15 when using a machine learning classifier for the temporal variation could be to combine the classifier for the temporal variation with the codebook accuracy classifier. The input features for the classifier stay the same as before. The labels are "should attempt mitigation" and "should not attempt mitigation." The label could be generated by attempting the codebook inaccuracy mitigation and if the end-result is better than not doing the mitigation, the state is labeled as "should attempt mitigation," otherwise the state is labeled as "should not attempt mitigation."

Figure 16:
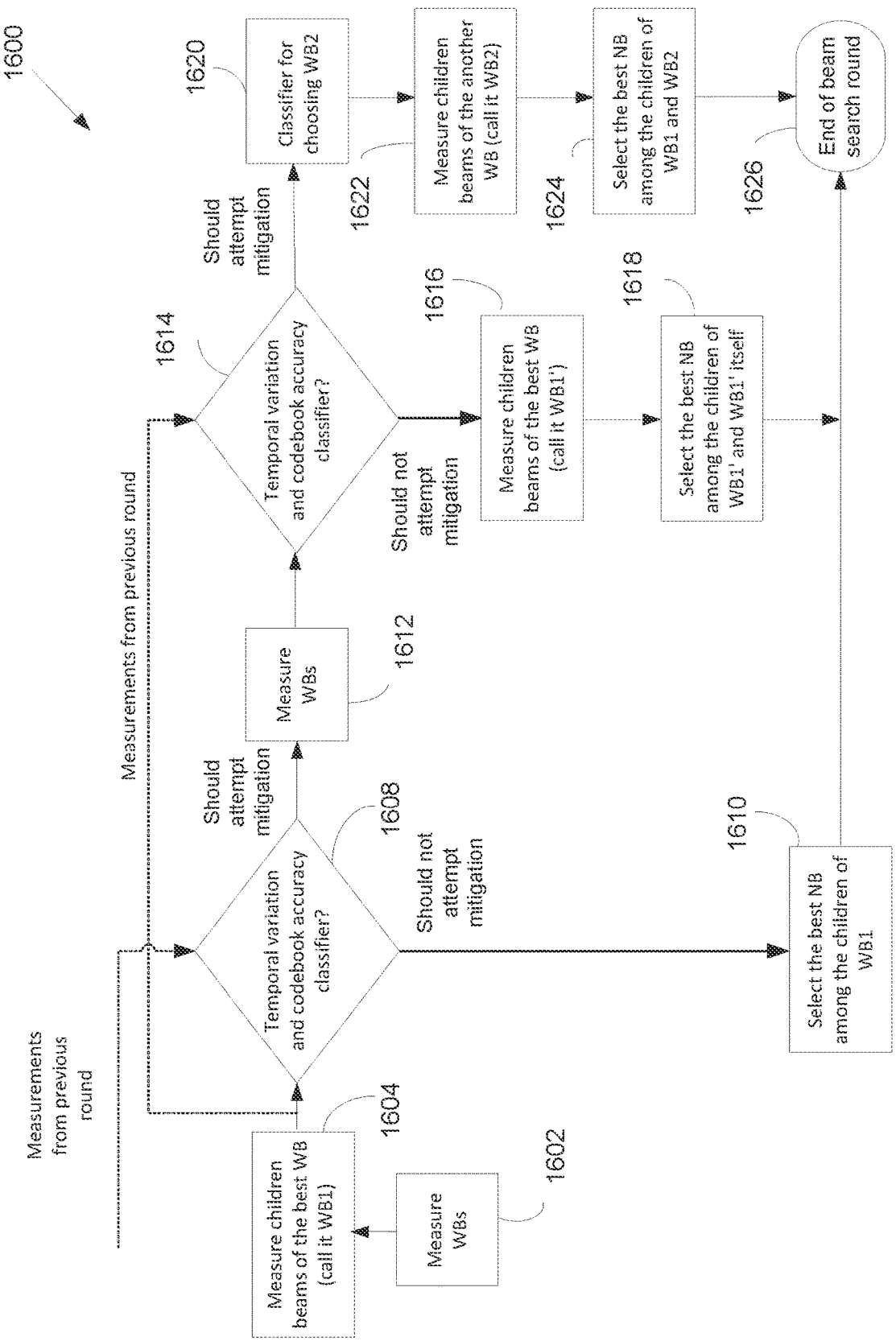
FIG. 16 illustrates another flowchart of a method for operating environment according to embodiments of the present disclosure.

FIG. 16 illustrates another flowchart of a method 1600 for operating environment according to embodiments of the present disclosure. An embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. FIG. 16 illustrates a modified embodiment from FIG. 15, where the temporal variation classifier and the codebook accuracy classifier are combined into one classifier.

As illustrated in FIG. 16, the method 1600 at step 1602 measures WBs and measures children beams of the best WB (e.g., WB1) at step 1604. At step 1608, the method 1500 determines temporal variation and codebook accuracy classifier. If "should not attempt mitigation" at step 1608, the method 1600 selects the best NB among the children of WB1 at step 1610; otherwise ("should attempt mitigation") the method 1600 measures WBs at step 1612. At step 1614, the method 1600 determines temporal variation and codebook accuracy classifier. At step 1614, if "should not attempt mitigation" the method 1600 measures children beams of the best WB (e.g., WB1') and selects the best NB among the children of WB1' and WB1' itself. At step 1614, if "should attempt mitigation," the method 1600 performs classification for choosing WB2 at step 1620 and measures children beams of another WB (e.g., WB2) at step 1622. At step 1624, the method selects the best NB among the children of WB1 and WB2 and ends the beam search round at step 1626.

Finally, as described in the aforementioned embodiments, for simplicity, no temporary beam change in considered while doing the mitigation. If the cost of beam change is low, it may be desirable to allow a temporary beam change during the mitigation. A modified version of the example embodiment of FIG. 12 to allow temporary beam change is FIG. 17. In this case, the beam selection in the current round happens regardless of the outcome of the codebook accuracy classifier. If the beam selection turns out to be accurate, there is no need for a correction. If the beam selection is inaccurate, then the beam selection maybe overwritten after the following round of measurements.

Figure 17:
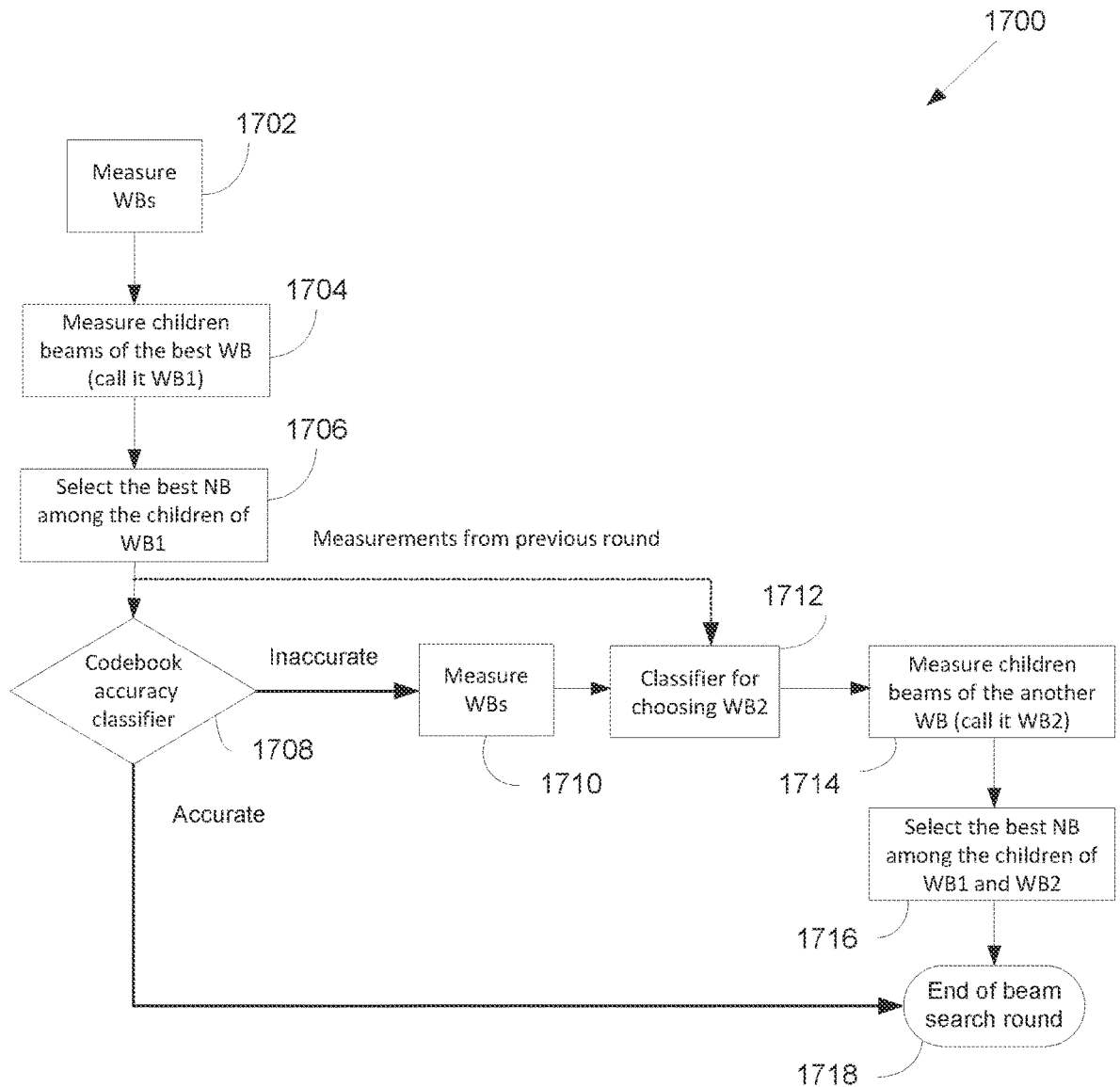
FIG. 17 illustrates another flowchart of a method for allowing temporary beam change according to embodiments of the present disclosure.

FIG. 17 illustrates another flowchart of a method 1700 for allowing temporary beam change according to embodiments of the present disclosure. An embodiment of the method 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions.

As illustrated in FIG. 17, the method 1700 at step 1702 measures WBs and measures children beams of the best WB (e.g., WB1) at step 1704. At step 1706, the method 1700 selects the best NB among the children of WB1. At step 1708, the method 1700 determines accuracy using a codebook accuracy classifier. At step 1708, if accurate the method 1700 ends the beam search round at step 1718; otherwise (inaccurate), the method 1700 measures WBS at step 1710. At step 1712, the method 1700 performs classification for choosing WB2 and measures children beams of another WB (e.g., WB2) at step 1714. At step 1716, the method selects the best NB among the children of WB1 and WB2 and ends the beam search round at step 1718.

In the present disclosure, the aforementioned embodiments focus on the use of up to two rounds of measurements to mitigate the codebook inaccuracy. This is just for clarity and ease of description. With k>2 WB reports, it is also possible to generalize to allow the search on more than two measurement rounds.

In one example, a condition 1 may be modified to check all WBs that have signal strength less than the threshold to the best WB as the candidates for the refinement. Then, the procedure can perform the refinement in a similar fashion as illustrated in FIG. 9, but it would continue to the third to measure the children of third best WB, and the fourth and so on, before it makes the final beam selection by selecting the best NB among the children of those WBs falling within the threshold to the best WB. Note that the procedure could allow all k WBs, or it could limit the number of candidate beams allowed. For example, if it allows up to three candidates, there would be an additional round to measure the children of the third WB before making the final selection. Note that the solutions described so far uses up to two candidates.

In the present disclosure, the use of an extension of condition 1 is described to identify multiple candidate WBs for measurements (e.g., more than two candidates), but this can be similarly applied to the machine learning-based solutions as well. In that case, the classifier for choosing WB2 could instead be trained to choose M candidate WBs with M≥1 (M=1 as illustrated in FIG. 17).

In one example, a recommender system solution may be used to make these candidate choices. One could also train separate classifiers each for choosing one candidate. For example, one classifier for choosing WB2, another classifier for choosing WB3, and so on. Note that for the separate classifier approach, the later ones would also have access to the measurements of the children NBs of the prior candidates, and those measurements could also be used as input for the classifier.

One drawback is the delayed beam change, which can become problematic when the temporal variation is high. Note that this comes from the timing of the measurement opportunities it is assumed, which is shown in FIG. 8. In other implementations, it could be possible to allow multiple NB measurement opportunities in each measurement round on an as-needed basis as for example shown in FIG. 18. In this case, when it is determined that the codebook inaccuracy is likely, the additional NB measurement opportunity is enabled and the measurements can be proceeded without much delay and it can be finished within the same measurement round.

Figure 18:
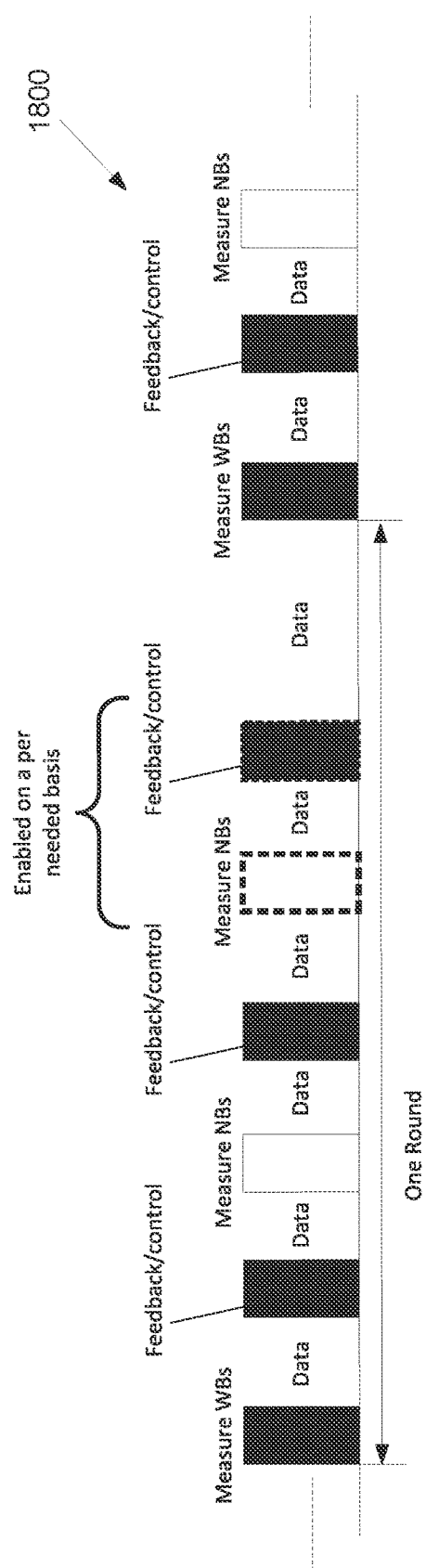
FIG. 18 illustrates an example timing structure according to embodiments of the present disclosure.

FIG. 18 illustrates an example timing structure 1800 according to embodiments of the present disclosure. An embodiment of the timing structure 1800 shown in FIG. 18 is for illustration only.

Figure 19:
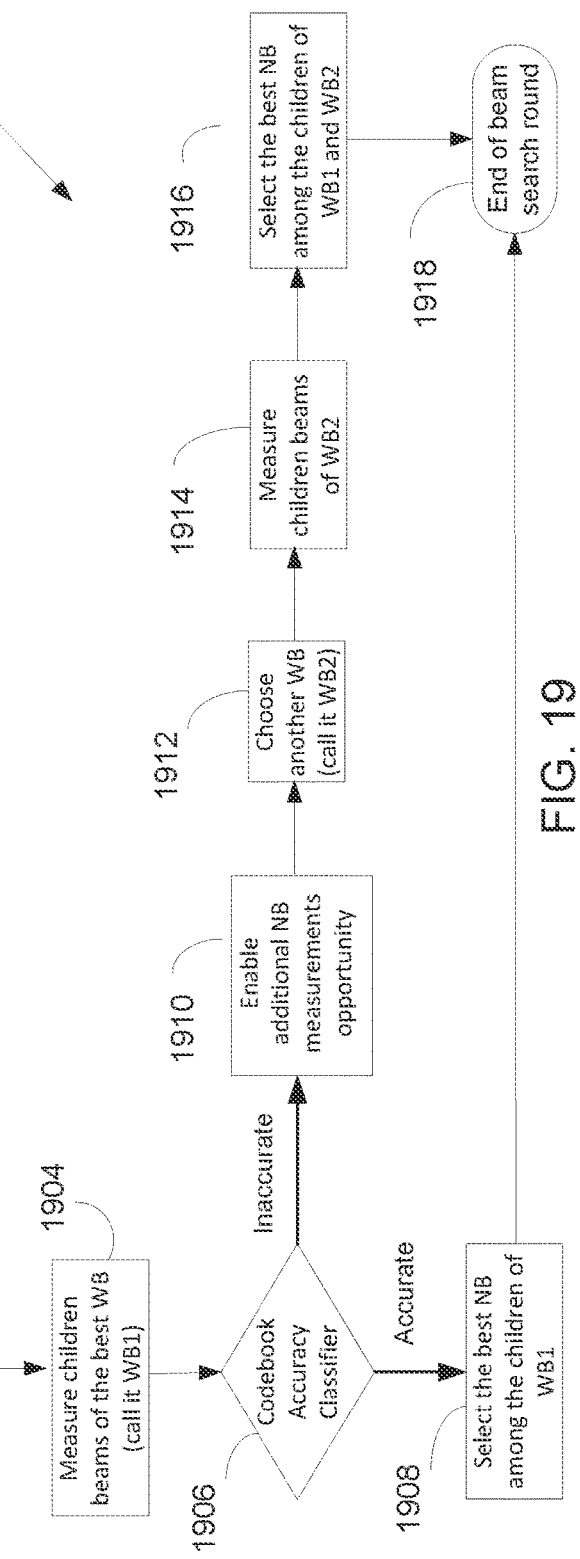
FIG. 19 illustrates a flowchart of a method for supporting the use of additional NB measurement opportunities according to embodiments of the present disclosure.

An example showing the modified overall flow to allow this as-needed NB measurement opportunity is provided in FIG. 19. Note that in this case, the extra NB measurement opportunities incur additional overhead, but the extra NB measurement opportunities can cut down the delayed in the beam change when the procedure determines that the codebook is likely not accurate. This could be a more desirable operation mode for a deployment environment with a high temporal variation.

FIG. 19 illustrates a flowchart of a method 1900 for supporting the use of additional NB measurement opportunities according to embodiments of the present disclosure. An embodiment of the method 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions.

As illustrated in FIG. 19, the method 1900 at step 1902 measures WBs and measures children beams of the best WB (e.g., WB1) at step 1904. At step 1906, the method 1900 determines if the codebook is accurate. At step 1906, if accurate, the method 1900 selects the best NB among the children of WB1 at step 1908 and ends the beam search round at step 1918. At step 1906, if inaccurate, the method 1900 enables additional NB measurement opportunities at step 1910. The method 1900 at step 1912 chooses another WB (e.g., WB2) and selects the best NB among the children of WB1 and WB2 at step 1916, and then ends the beam search round at step 1918.

In the present disclosure, the aforementioned embodiments are described from the perspective of the base station, but similar ideas can also be applied at the user side. Particularly, when the user observes similar signal strengths on multiple of the user's beams, it is possible that there could be some beam mismatch and an expanded search could help improve the signal quality. For a concrete description, it may be assumed that the user is directional with M beams (assuming non-hierarchical for simplicity). The user may measure the base station beams for all the user's beams according to some schedule (e.g., a round-robin scheduling could be used) and maintain measurement tables.

The user may maintain a measurement table of all base station WBs and all the user's beams. In that case, if the user observes that there are multiple entries of similar values in the base station WB measurement table corresponding to one base station WB and multiple of the user's beams, the user may determine that the user's beam selection could be improved with expanded search over multiple of its beams. This is the condition 1 as described in the aforementioned embodiments for the base station but is now applied for the user side (e.g., UE). In this case, the user while reporting the same best WB to the base station, the user may use multiple of its beams to measure the NBs (children of the reported WB) over multiple rounds. This way, the user can refine the beam that could match better to the finally selected base station NB.

Figure 20:
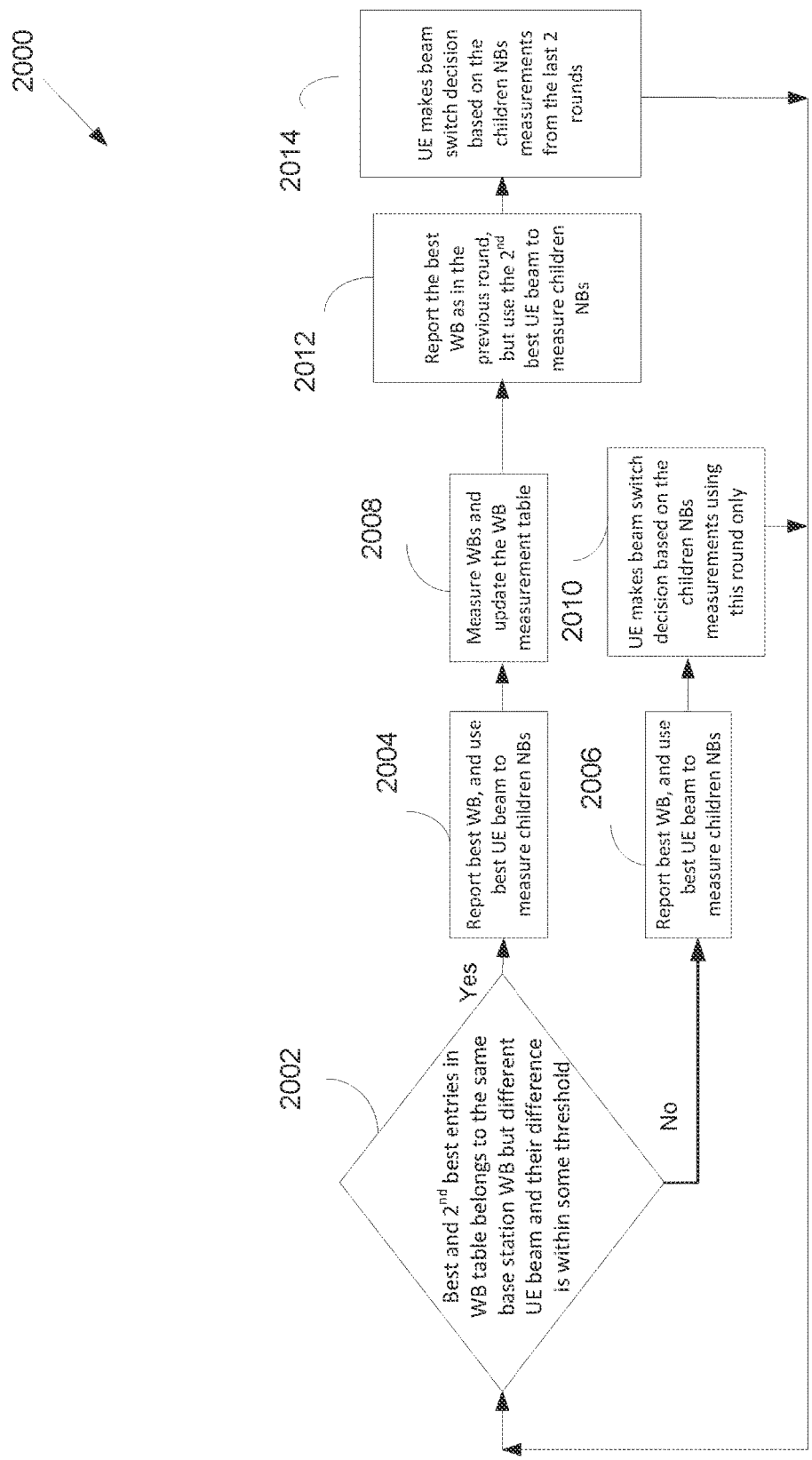
FIG. 20 illustrates an example procedure for detecting the potential of refining beams according to embodiments of the present disclosure.

In one example, the user refines up to two of its beams (the best and $2^{nd}$ best user beams) is shown in FIG. 20. The user could choose to refine over more than two of beams in a similar manner as described earlier for the base station beam operations. Regarding the threshold used for this example embodiment, the same range of values as for the condition 1 for the base station as described earlier may be used.

FIG. 20 illustrates an example method 2000 for detecting the potential of refining beams according to embodiments of the present disclosure. An embodiment of the method 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

FIG. 20 illustrates an example where the user detects the potential of refining beams using the WB measurement tables. If two entries in the WB measurement table belongs to the same base station WB but two different user's beams and the signal strength difference (in dB) is below some threshold, the user may choose to first measure the children NBs of the best base station beam using the user beam corresponding to the best entry. Then in the next measurement round, the user selects the beam corresponding to the $2^{nd}$ best entry in the WB measurement table. Only after that, the user makes the beam switch decision.

As illustrated in FIG. 20, the method 2000 at step 2002 determines best and 2nd best entries in WB table belongs to the same base station WB but different UE beam and their difference is within some threshold. At step 2002, if not determined (No), the method 2000 reports best WB and uses best UE beam to measure children NBs at step 2006. And then the method 2000 provides at step 2010 that a UE makes beam switch decision based on the children NBs measurements using this round only. At step 2002, if detected (Yes), the method 2000 reports best WB and uses best UE beam to measure children NBs at step 2004. At step 2008 the method 2000 measures WBs and updates the WB measurement table. At step 2012, the method 2000 reports the best WB as in the previous round but uses the 2nd best UE beam to measure children NBs. At step 2014, the method provides that a UE makes beam switch decision based on the children NBs measurements from the last 2 rounds.

Figure 21:
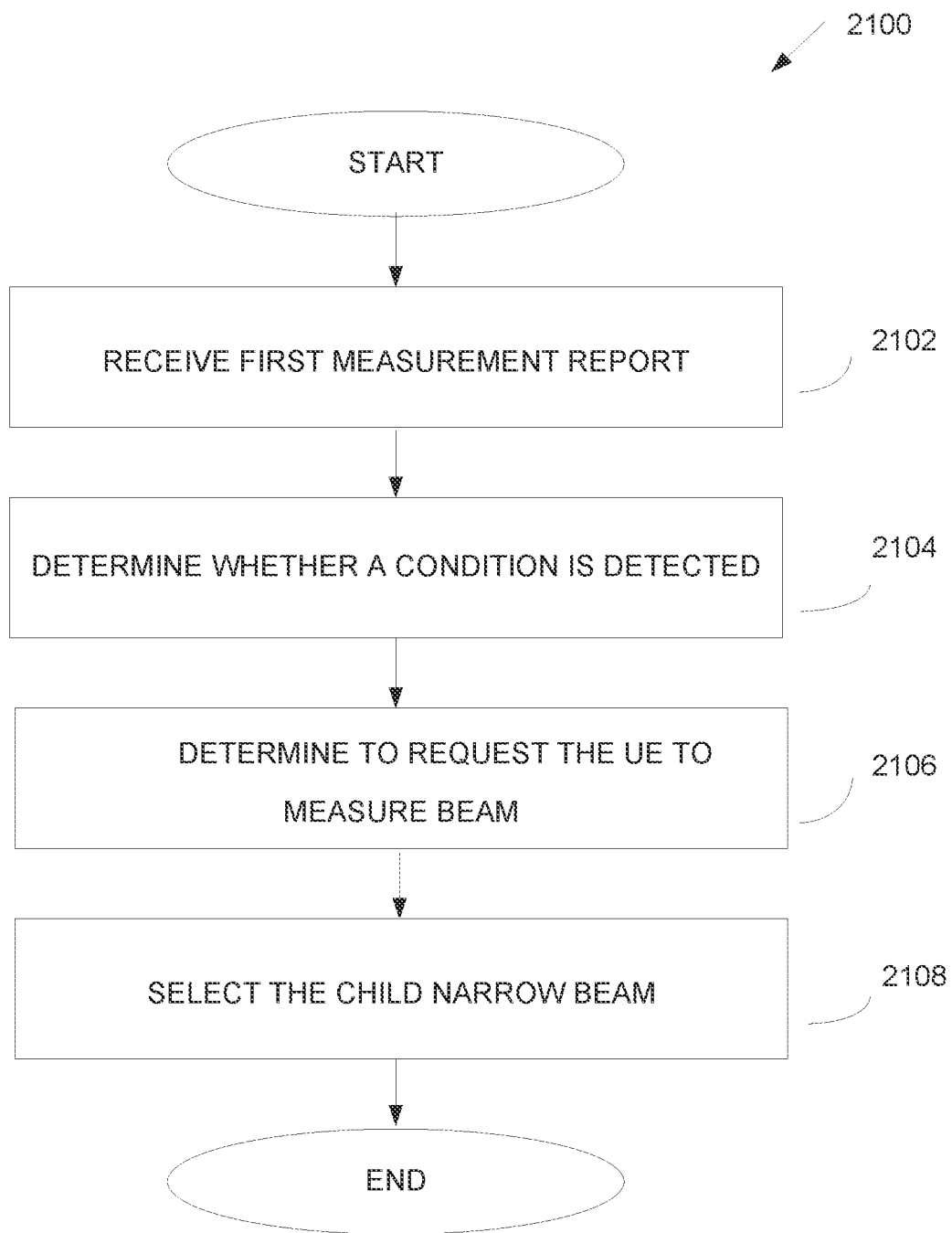
FIG. 21 illustrates a flowchart of a method for mitigating codebook inaccuracy when using hierarchical beam operations according to embodiments of the present disclosure.

FIG. 21 illustrates a flowchart of a method 2100 for mitigating codebook inaccuracy when using hierarchical beam operations according to embodiments of the present disclosure. An embodiment of the method 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. the method 2100 may be performed by a BS (e.g., 101 as illustrated in FIG. 1).

As illustrated in FIG. 21, the method 2100 begins at step 2102. In step 2102, a BS receives, from a UE, a first measurement report indicating information about at least first and second wide beams in a set of wide beams for a beam selection, the first measurement report generated based on measurement of a first set of child narrow beams of the first wide beam.

In one embodiment, the first measurement report includes information indicating signal strengths for the wide beams in the set of wide beams.

In another embodiment, the first measurement report includes information indicating a signal strength for the first wide beam and signal strengths of child narrow beams in the first set of child narrow beams.

In step 2104, the BS determines based on the first measurement report, whether a condition is detected for requesting measurement of a second set of child narrow beams of a second wide beam in the set of wide beams.

In step 2106, the BS, based on a determination that the condition is detected, determines to request the UE to measure the second set of child narrow beams of the second wide beam and, after receipt of a second measurement report indicating information about the second set of child narrow beams, selects a child narrow beam for use from one of the first set of child narrow beams and the second set of child narrow beams.

In step 2108, the BS, based on a determination that the condition is not detected, selects the child narrow beam for use from the first set of child narrow beams.

In one embodiment, the BS determines that the condition is detected based on a determination that a difference between the signal strengths of the first wide beam and the second wide beam is less than predetermined threshold.

In one embodiment, the BS determines that the condition is detected based on a determination that a difference between the signal strength of the first wide beam and the signal strength of a best narrow beam in the first set of child narrow beams is greater than a predetermined threshold.

In one embodiment, the BS performs, based on training data, a machine learning prediction operation, the training data generated based on at least one of a beam pattern of the BS, a beam pattern of the UE, and information for propagation channels, and selects, based on a result of the machine learning prediction operation, the second wide beam.

In one embodiment, the BS determines signal strengths for the beam selection based on the beam pattern of the BS, the beam pattern of the UE, a channel model, and an antenna orientation of the UE.

In one embodiment, the BS generates one or more training samples based on (i) the signal strengths and (ii) an accuracy of a codebook.

In one embodiment, the BS identifies a signal strength of the first wide beam and a signal strength of a best child narrow beam in the first set of child narrow beams; determines, prior to a determination of whether the condition is detected, whether a larger of the signal strength of the first wide beam and the signal strength of the best child narrow beam is not less than a predetermined threshold; and determines to skip request of the UE to measure the second set of child narrow beams and to select the first wide beam based on a determination that the larger of the signal strength of the first wide beam and the signal strength of the best child narrow beam is not less than the predetermined threshold.

In one embodiment, the BS compares beam measurement results between a previous measurement round for the set of wide beams and a current measurement round for the set of wide beams; determines a speed of a temporal variation based on the compared beam measurement results; and determines to perform a codebook inaccuracy mitigation process prior to the beam selection for the current measurement round based on comparison of the speed of the temporal variation to a threshold.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system, the BS comprising:
    a transceiver configured to receive, from a user equipment (UE), a first measurement report indicating information about a first wide beam and a second wide beam in a set of wide beams for a beam selection, wherein the first measurement report is generated based on measurement of a first set of child narrow beams of the first wide beam; and
    a processor operably connected to the transceiver, the processor configured to:
        determine based on the first measurement report, whether a condition is detected for requesting measurement of a second set of child narrow beams of the second wide beam in the set of wide beams;
        based on a determination that the condition is detected, determine to request the UE to measure the second set of child narrow beams of the second wide beam and, after receipt of a second measurement report indicating information about the second set of child narrow beams, select a child narrow beam for use from one of the first set of child narrow beams and the second set of child narrow beams; and
        based on a determination that the condition is not detected, select the child narrow beam for use from the first set of child narrow beams.

2. The BS of claim 1, wherein:
    the first measurement report includes information indicating signal strengths for the set of wide beams; and
    the processor is further configured to determine that the condition is detected based on a determination that a difference between a signal strength of the first wide beam and a signal strength of the second wide beam is less than a predetermined threshold.

3. The BS of claim 1, wherein:
    the first measurement report includes information indicating a signal strength of the first wide beam and signal strengths of the child narrow beams in the first set of child narrow beams; and
    the processor is further configured to determine that the condition is detected based on a determination that a difference between the signal strength of the first wide beam and a signal strength of a best narrow beam in the first set of child narrow beams is greater than a predetermined threshold.

4. The BS of claim 1, wherein the processor is further configured to:
    perform, based on training data, a machine learning prediction operation, the training data being generated based on at least one of a beam pattern of the BS, a beam pattern of the UE, and information for propagation channels; and
    select, based on a result of the machine learning prediction operation, the second wide beam.

5. The BS of claim 4, wherein the processor is further configured to determine signal strengths for the beam selection based on the beam pattern of the BS, the beam pattern of the UE, a channel model, and an antenna orientation of the UE.

6. The BS of claim 5, wherein the processor is further configured to generate one or more training samples based on (i) the signal strengths and (ii) an accuracy of a codebook.

7. The BS of claim 1, wherein the processor is further configured to:
    identify a signal strength of the first wide beam and a signal strength of a best child narrow beam in the first set of child narrow beams;
    determine, prior to a determination of whether the condition is detected, whether a larger of the signal strength of the first wide beam and the signal strength of the best child narrow beam is not less than a predetermined threshold; and
    determine to skip request of the UE to measure the second set of child narrow beams and to select the first wide beam based on a determination that the larger of the signal strength of the first wide beam and the signal strength of the best child narrow beam is not less than the predetermined threshold.

8. The BS of claim 1, wherein the processor is further configured to:
    compare beam measurement results between a previous measurement round for the set of wide beams and a current measurement round for the set of wide beams;
    determine a speed of a temporal variation based on the compared beam measurement results; and
    determine to perform a codebook inaccuracy mitigation process prior to the beam selection for the current measurement round based on comparison of the speed of the temporal variation to a threshold.

9. A user equipment (UE) in a wireless communication system, the UE comprising:
    a transceiver configured to:
        transmit, to a base station (BS), a first measurement report indicating information about a first wide beam and a second wide beam in a set of wide beams for a beam selection, wherein the first measurement report is generated based on measurement of a first set of child narrow beams of the first wide beam; and receive, from the BS, a request to measure a second set of child narrow beams of the second wide beam, after transmission of a second measurement report indicating information about the second set of child narrow beams, wherein:
- a reception of the request is determined based on a determination that a condition is detected, based on the first measurement report, for requesting measurement of a second set of child narrow beams of the second wide beam in the set of wide beams; and
- a child narrow beam is selected, at the BS, for use from the first set of child narrow beams based on a determination that the condition is not detected.

10. The UE of claim 9, wherein:
the first measurement report includes information indicating signal strengths for the set of wide beams; and
the condition is detected, at the BS, based on a determination that a difference between a signal strength of the first wide beam and a signal strength of the second wide beam is less than a predetermined threshold.

11. The UE of claim 9, wherein:
The first measurement report includes information indicating a signal strength of the first wide beam and signal strengths of the child narrow beams in the first set of child narrow beams; and
the condition is detected based on a determination that a difference between the signal strength of the first wide beam and a signal strength of a best narrow beam in the first set of child narrow beams is greater than a predetermined threshold.

12. The UE of claim 11, wherein signal strengths for the beam selection is determined based on a beam pattern of the BS, a beam pattern of the UE, a channel model, and an antenna orientation of the UE.

13. A method of a base station (BS) in a wireless communication system, the method comprising:
- receiving, from a user equipment (UE), a first measurement report indicating information about a first wide beam and a second wide beam in a set of wide beams for a beam selection, wherein the first measurement report is generated based on measurement of a first set of child narrow beams of the first wide beam;
- determining, based on the first measurement report, whether a condition is detected for requesting measurement of a second set of child narrow beams of the second wide beam in the set of wide beams;
- based on a determination that the condition is detected, determining to request the UE to measure the second set of child narrow beams of the second wide beam and, after receipt of a second measurement report indicating information about the second set of child narrow beams, selecting a child narrow beam for use from one of the first set of child narrow beams and the second set of child narrow beams; and
- based on a determination that the condition is not detected, selecting the child narrow beam for use from the first set of child narrow beams.

14. The method of claim 13, further comprising determining that the condition is detected based on a determination that a difference between a signal strength of the first wide beam and a signal strength of the second wide beam is less than a predetermined threshold,
wherein the first measurement report includes information indicating signal strengths for the set of wide beams.

15. The method of claim 13, further comprising determining that the condition is detected based on a determination that a difference between a signal strength of the first wide beam and a signal strength of a best narrow beam in the first set of child narrow beams is greater than a predetermined threshold,
Wherein the first measurement report includes information indicating the signal strength of the first wide beam and signal strengths of the child narrow beams in the first set of child narrow beams.

16. The method of claim 13, further comprising:
- performing, based on training data, a machine learning prediction operation, wherein the training data is generated based on at least one of a beam pattern of the BS, a beam pattern of the UE, and information for propagation channels; and
- selecting, based on a result of the machine learning prediction operation, the second wide beam.

17. The method of claim 16, further comprising determining signal strengths for the beam selection based on the beam pattern of the BS, the beam pattern of the UE, a channel model, and an antenna orientation of the UE.

18. The method of claim 17, further comprising generating one or more training samples based on (i) the signal strengths and (ii) an accuracy of a codebook.

19. The method of claim 13, further comprising:
- identifying a signal strength of the first wide beam and a signal strength of a best child narrow beam in the first set of child narrow beams;
- determining, prior to a determination of whether the condition is detected, whether a larger of the signal strength of the first wide beam and the signal strength of the best child narrow beam is not less than a predetermined threshold; and
- determining to skip request of the UE to measure the second set of child narrow beams and to select the first wide beam based on a determination that the larger of the signal strength of the first wide beam and the signal strength of the best child narrow beam is not less than the predetermined threshold.

20. The method of claim 13, further comprising:
- comparing beam measurement results between a previous measurement round for the set of wide beams and a current measurement round for the set of wide beams;
- determining a speed of a temporal variation based on the compared beam measurement results; and
- determining to perform a codebook inaccuracy mitigation process prior to the beam selection for the current measurement round based on comparison of the speed of the temporal variation to a threshold.

* * * * *